(12) United States Patent
Yun et al.

(10) Patent No.: US 12,429,437 B2
(45) Date of Patent: Sep. 30, 2025

(54) SYSTEM AND METHOD FOR X-RAY ABSORPTION SPECTROSCOPY USING SPECTRAL INFORMATION FROM TWO ORTHOGONAL PLANES

(71) Applicant: Sigray, Inc., Concord, CA (US)

(72) Inventors: Wenbing Yun, Walnut Creek, CA (US); Janos Kirz, Berkeley, CA (US); Sylvia Jia Yun Lewis, San Francisco, CA (US)

(73) Assignee: Sigray, Inc., Benicia, CA (US)

( * ) Notice: Subject to any disclaimer, the term of this patent is extended or adjusted under 35 U.S.C. 154(b) by 0 days.

(21) Appl. No.: 18/937,615

(22) Filed: Nov. 5, 2024

(65) Prior Publication Data
US 2025/0146960 A1    May 8, 2025

Related U.S. Application Data

(60) Provisional application No. 63/596,734, filed on Nov. 7, 2023.

(51) Int. Cl.
| | | |
|---|---|---|
| *G01N 23/085* | (2018.01) | |
| *G01N 23/207* | (2018.01) | |
| *G01N 23/223* | (2006.01) | |

(52) U.S. Cl.
CPC ....... *G01N 23/085* (2018.02); *G01N 23/2076* (2013.01); *G01N 23/223* (2013.01);
(Continued)

(58) Field of Classification Search
None
See application file for complete search history.

(56) References Cited

U.S. PATENT DOCUMENTS

| | | | |
|---|---|---|---|
| 3,102,196 A | * | 8/1963 | Ladell .................. G01N 23/223 378/49 |
| 4,169,228 A | | 9/1979 | Briska et al. |

(Continued)

FOREIGN PATENT DOCUMENTS

| | | |
|---|---|---|
| CN | 1656373 A | 8/2005 |
| CN | 1829910 A | 9/2006 |

(Continued)

OTHER PUBLICATIONS

International Search Report and Written Opinion for PCT Appl. No. PCT/US2024/054598, dated Feb. 28, 2025.

(Continued)

*Primary Examiner* — Thomas R Artman
(74) *Attorney, Agent, or Firm* — Knobbe, Martens, Olson & Bear, LLP

(57) ABSTRACT

An apparatus includes an x-ray source configured to generate x-rays, at least some of which impinge a sample and at least one diffractor configured to concurrently diffract at least some of the x-rays from the sample in a first direction and in a second direction substantially orthogonal to the first direction. The apparatus further includes at least one two-dimensional (2D) position-sensitive x-ray detector configured to receive at least some of the diffracted x-rays and to concurrently generate first spectral information of the x-rays diffracted in the first direction and second spectral information of the x-rays diffracted in the second direction. The apparatus further includes circuitry configured to receive the first and second spectral information and to generate a single x-ray absorption spectroscopy (XAS) spectrum using the first and second spectral information.

23 Claims, 10 Drawing Sheets

(52) U.S. Cl.
CPC .......... *G01N 2223/041* (2013.01); *G01N 2223/0563* (2013.01); *G01N 2223/0568* (2013.01); *G01N 2223/076* (2013.01); *G01N 2223/1016* (2013.01); *G01N 2223/304* (2013.01); *G01N 2223/321* (2013.01); *G01N 2223/501* (2013.01)

(56) References Cited

U.S. PATENT DOCUMENTS

| | | |
|---|---|---|
| 4,642,811 A | 2/1987 | Georgopoulos |
| 4,945,552 A | 7/1990 | Ueda |
| 5,016,265 A | 5/1991 | Hoover et al. |
| 5,132,997 A | 7/1992 | Kojima |
| 5,173,928 A | 12/1992 | Momose et al. |
| 5,204,887 A | 4/1993 | Hayashida et al. |
| 5,220,591 A | 6/1993 | Ohsugi et al. |
| 5,249,216 A | 9/1993 | Ohsugi et al. |
| 5,280,176 A | 1/1994 | Jach et al. |
| 5,684,857 A | 11/1997 | De Bokx |
| 5,732,120 A | 3/1998 | Shoji et al. |
| 5,778,039 A | 7/1998 | Hossain |
| 5,790,628 A | 8/1998 | Ishida |
| 5,812,629 A | 9/1998 | Clauser |
| 5,832,052 A | 11/1998 | Hirose et al. |
| 5,912,940 A | 6/1999 | O'Hara |
| 5,930,586 A | 7/1999 | Jain et al. |
| 6,108,398 A | 8/2000 | Mazor et al. |
| 6,181,773 B1 | 1/2001 | Lee et al. |
| 6,195,410 B1 | 2/2001 | Cash, Jr. |
| 6,226,347 B1 | 5/2001 | Golenhofen |
| 6,381,303 B1 | 4/2002 | Vu et al. |
| 6,430,254 B2 | 8/2002 | Wilkins |
| 6,442,231 B1 | 8/2002 | O'Hara |
| 6,456,688 B1 | 9/2002 | Taguchi et al. |
| 6,504,902 B2 | 1/2003 | Iwasaki et al. |
| 6,512,814 B2 | 1/2003 | Yokhin et al. |
| 6,577,704 B1 | 6/2003 | Holz |
| 6,611,577 B1 | 8/2003 | Yamagami |
| 6,639,968 B2 | 10/2003 | Yokhin et al. |
| 6,711,234 B1 | 3/2004 | Loxley et al. |
| 6,763,086 B2 | 7/2004 | Platonov |
| 6,829,327 B1 | 12/2004 | Chen |
| 6,891,627 B1 | 5/2005 | Levy et al. |
| 6,895,071 B2 | 5/2005 | Yokhin et al. |
| 6,914,723 B2 | 7/2005 | Yun et al. |
| 6,934,359 B2 | 8/2005 | Chen |
| 7,006,596 B1 | 2/2006 | Janik |
| 7,010,086 B2 | 3/2006 | Chopra |
| 7,023,955 B2 | 4/2006 | Chen et al. |
| 7,075,073 B1 | 7/2006 | Janik et al. |
| 7,095,822 B1 | 8/2006 | Yun |
| 7,119,953 B2 | 10/2006 | Yun et al. |
| 7,120,228 B2 | 10/2006 | Yokhin et al. |
| 7,180,979 B2 | 2/2007 | Momose |
| 7,183,547 B2 | 2/2007 | Yun et al. |
| 7,187,751 B2 | 3/2007 | Kawahara et al. |
| 7,215,736 B1 | 5/2007 | Wang et al. |
| 7,218,703 B2 | 5/2007 | Yada et al. |
| 7,221,731 B2 | 5/2007 | Yada et al. |
| 7,245,696 B2 | 7/2007 | Yun et al. |
| 7,258,485 B2 | 8/2007 | Nakano et al. |
| 7,268,945 B2 | 9/2007 | Yun et al. |
| 7,388,942 B2 | 6/2008 | Wang et al. |
| 7,394,890 B1 | 7/2008 | Wang et al. |
| 7,400,704 B1 | 7/2008 | Yun et al. |
| 7,406,151 B1 | 7/2008 | Yun |
| 7,414,787 B2 | 8/2008 | Yun et al. |
| 7,453,560 B2 | 11/2008 | Miyake |
| 7,463,712 B2 | 12/2008 | Zhu et al. |
| 7,486,770 B2 | 2/2009 | Baumann |
| 7,492,871 B2 | 2/2009 | Popescu |
| 7,499,521 B2 | 3/2009 | Wang et al. |
| 7,515,684 B2 | 4/2009 | Gibson et al. |
| 7,519,153 B1 | 4/2009 | Moore |
| 7,522,698 B2 | 4/2009 | Popescu |
| 7,522,708 B2 | 4/2009 | Heismann |
| 7,532,704 B2 | 5/2009 | Hempel |
| 7,551,719 B2 | 6/2009 | Yokhin et al. |
| 7,551,722 B2 | 6/2009 | Ohshima et al. |
| 7,561,662 B2 | 7/2009 | Wang et al. |
| 7,564,941 B2 | 7/2009 | Baumann |
| 7,639,786 B2 | 12/2009 | Baumann |
| 7,646,843 B2 | 1/2010 | Popescu et al. |
| 7,653,177 B2 | 1/2010 | Baumann et al. |
| 7,680,243 B2 | 3/2010 | Yokhin et al. |
| 7,778,389 B2 | 8/2010 | Yoneyama |
| 7,787,588 B1 | 8/2010 | Yun et al. |
| 7,796,725 B1 | 9/2010 | Yun et al. |
| 7,796,726 B1 | 9/2010 | Gendreau et al. |
| 7,809,113 B2 | 10/2010 | Aoki et al. |
| 7,813,475 B1 | 10/2010 | Wu et al. |
| 7,817,777 B2 | 10/2010 | Baumann et al. |
| 7,848,483 B2 | 12/2010 | Platonov |
| 7,864,922 B2 | 1/2011 | Kawabe |
| 7,889,838 B2 | 2/2011 | David et al. |
| 7,899,154 B2 | 3/2011 | Chen et al. |
| 7,920,676 B2 | 4/2011 | Yun et al. |
| 7,924,973 B2 | 4/2011 | Kottler et al. |
| 7,945,018 B2 | 5/2011 | Heismann |
| 7,949,092 B2 | 5/2011 | Brons |
| 7,974,379 B1 | 7/2011 | Case et al. |
| 7,983,381 B2 | 7/2011 | David et al. |
| 8,005,185 B2 | 8/2011 | Popescu |
| 8,009,796 B2 | 8/2011 | Popescu |
| 8,009,797 B2 | 8/2011 | Ouchi |
| 8,041,004 B2 | 10/2011 | David |
| 8,058,621 B2 | 11/2011 | Kommareddy |
| 8,068,579 B1 | 11/2011 | Yun et al. |
| 8,073,099 B2 | 12/2011 | Niu et al. |
| 8,139,711 B2 | 3/2012 | Takahashi |
| 8,165,270 B2 | 4/2012 | David et al. |
| 8,184,771 B2 | 5/2012 | Murakoshi |
| 8,233,587 B2 | 7/2012 | Sato |
| 8,243,879 B2 | 8/2012 | Itoh et al. |
| 8,306,183 B2 | 11/2012 | Koehler |
| 8,351,570 B2 | 1/2013 | Nakamura |
| 8,353,628 B1 | 1/2013 | Yun et al. |
| 8,374,309 B2 | 2/2013 | Donath |
| 8,451,975 B2 | 5/2013 | Tada |
| 8,513,603 B1 | 8/2013 | Lederman et al. |
| 8,559,594 B2 | 10/2013 | Ouchi |
| 8,559,597 B2 | 10/2013 | Chen et al. |
| 8,565,371 B2 | 10/2013 | Bredno |
| 8,591,108 B2 | 11/2013 | Tada |
| 8,602,648 B1 | 12/2013 | Jacobsen et al. |
| 8,632,247 B2 | 1/2014 | Ishii |
| 8,767,915 B2 | 7/2014 | Stutman |
| 8,767,916 B2 | 7/2014 | Hashimoto |
| 8,781,069 B2 | 7/2014 | Murakoshi |
| 8,824,629 B2 | 9/2014 | Ishii |
| 8,855,265 B2 | 10/2014 | Engel |
| 8,859,977 B2 | 10/2014 | Kondoh |
| 8,908,824 B2 | 12/2014 | Kondoh |
| 8,972,191 B2 | 3/2015 | Stampanoni et al. |
| 8,989,474 B2 | 3/2015 | Kido et al. |
| 9,001,967 B2 | 4/2015 | Baturin |
| 9,016,943 B2 | 4/2015 | Jacobsen et al. |
| 9,025,725 B2 | 5/2015 | Kiyohara et al. |
| 9,031,201 B2 | 5/2015 | Sato |
| 9,036,773 B2 | 5/2015 | David et al. |
| 9,063,055 B2 | 6/2015 | Ouchi |
| 9,086,536 B2 | 7/2015 | Pang et al. |
| 9,129,715 B2 | 9/2015 | Adler et al. |
| 9,222,899 B2 | 12/2015 | Yamaguchi |
| 9,230,703 B2 | 1/2016 | Mohr et al. |
| 9,234,856 B2 | 1/2016 | Mukaide |
| 9,291,578 B2 | 3/2016 | Adler |
| 9,329,141 B2 | 5/2016 | Stutman |
| 9,357,975 B2 | 6/2016 | Baturin |
| 9,439,613 B2 | 9/2016 | Stutman |
| 9,448,190 B2 | 9/2016 | Yun et al. |
| 9,453,803 B2 | 9/2016 | Radicke |
| 9,480,447 B2 | 11/2016 | Mohr et al. |
| 9,486,175 B2 | 11/2016 | Fredenberg et al. |

(56) References Cited

U.S. PATENT DOCUMENTS

| | | | |
|---|---|---|---|
| 9,494,534 B2 | 11/2016 | Baturin | |
| 9,532,760 B2 | 1/2017 | Anton et al. | |
| 9,541,511 B2 | 1/2017 | Vigliante | |
| 9,551,677 B2 | 1/2017 | Mazor et al. | |
| 9,557,280 B2 | 1/2017 | Pfeiffer et al. | |
| 9,570,265 B1 | 2/2017 | Yun et al. | |
| 9,588,066 B2 | 3/2017 | Pois et al. | |
| 9,594,036 B2 | 3/2017 | Yun et al. | |
| 9,632,040 B2 | 4/2017 | Stutman | |
| 9,700,267 B2 | 7/2017 | Baturin et al. | |
| 9,719,947 B2 | 8/2017 | Yun et al. | |
| 9,748,012 B2 | 8/2017 | Yokoyama | |
| 9,757,081 B2 | 9/2017 | Proksa | |
| 9,761,021 B2 | 9/2017 | Koehler | |
| 9,770,215 B2 | 9/2017 | Souchay et al. | |
| 9,778,213 B2 | 10/2017 | Bakeman et al. | |
| 9,823,203 B2 | 11/2017 | Yun et al. | |
| 9,826,949 B2 | 11/2017 | Ning | |
| 9,861,330 B2 | 1/2018 | Rossl | |
| 9,874,531 B2 | 1/2018 | Yun et al. | |
| 9,881,710 B2 | 1/2018 | Roessl | |
| 9,916,655 B2 | 3/2018 | Sampanoni | |
| 10,028,716 B2 | 7/2018 | Rossl | |
| 10,045,753 B2 | 8/2018 | Teshima | |
| 10,074,451 B2 | 9/2018 | Kottler et al. | |
| 10,076,297 B2 | 9/2018 | Bauer | |
| 10,085,701 B2 | 10/2018 | Hoshino | |
| 10,141,081 B2 | 11/2018 | Preusche | |
| 10,151,713 B2 | 12/2018 | Wu et al. | |
| 10,153,061 B2 | 12/2018 | Yokoyama | |
| 10,153,062 B2 | 12/2018 | Gall et al. | |
| 10,247,683 B2 | 4/2019 | Yun et al. | |
| 10,267,752 B2 | 4/2019 | Zhang et al. | |
| 10,267,753 B2 | 4/2019 | Zhang et al. | |
| 10,295,485 B2 * | 5/2019 | Yun | G01N 23/087 |
| 10,304,580 B2 | 5/2019 | Yun et al. | |
| 10,349,908 B2 | 7/2019 | Yun et al. | |
| 10,352,695 B2 | 7/2019 | Dziura et al. | |
| 10,352,880 B2 | 7/2019 | Yun et al. | |
| 10,401,309 B2 | 9/2019 | Yun et al. | |
| 10,416,099 B2 | 9/2019 | Yun et al. | |
| 10,466,185 B2 | 11/2019 | Yun et al. | |
| 10,473,598 B2 | 11/2019 | Ogata et al. | |
| 10,485,492 B2 | 11/2019 | Koehler et al. | |
| 10,514,345 B2 | 12/2019 | Ogata et al. | |
| 10,514,346 B2 | 12/2019 | Sako | |
| 10,568,588 B2 | 2/2020 | Koehler et al. | |
| 10,578,566 B2 | 3/2020 | Yun et al. | |
| 10,634,628 B2 | 4/2020 | Kasper et al. | |
| 10,653,376 B2 | 5/2020 | Yun et al. | |
| 10,697,902 B2 | 6/2020 | Sharma et al. | |
| 10,782,252 B2 | 9/2020 | Gateshki et al. | |
| 10,794,845 B2 | 10/2020 | Filsinger | |
| 10,895,541 B2 | 1/2021 | Shchegrov et al. | |
| 10,962,491 B2 | 3/2021 | Yun et al. | |
| 10,976,270 B2 | 4/2021 | Wormington | |
| 10,976,273 B2 * | 4/2021 | Yun | H01J 35/18 |
| 10,989,819 B2 | 4/2021 | Wieczorek et al. | |
| 11,054,375 B2 | 7/2021 | Seidler et al. | |
| 11,175,243 B1 | 11/2021 | Yun et al. | |
| 11,215,572 B2 | 1/2022 | Yun et al. | |
| 11,378,530 B2 * | 7/2022 | Sato | G01N 23/2209 |
| 11,428,651 B2 * | 8/2022 | Yun | G01N 23/223 |
| 11,549,895 B2 | 1/2023 | Yun et al. | |
| 11,686,692 B2 | 6/2023 | Vine et al. | |
| 11,733,185 B2 | 8/2023 | Ogata et al. | |
| 11,796,490 B2 | 10/2023 | Seidler et al. | |
| 11,885,755 B2 * | 1/2024 | Yun | G01N 23/2076 |
| 12,209,977 B2 * | 1/2025 | Yun | G01N 23/20008 |
| 2001/0046276 A1 | 11/2001 | Schneider et al. | |
| 2002/0090051 A1 | 7/2002 | Oikawa | |
| 2002/0150208 A1 | 10/2002 | Yohkin et al. | |
| 2003/0072413 A1 | 4/2003 | Yokhin et al. | |
| 2003/0142781 A1 | 7/2003 | Kawahara | |
| 2003/0223536 A1 | 12/2003 | Yun et al. | |
| 2004/0028186 A1 | 2/2004 | Yokhin et al. | |
| 2005/0087699 A1 | 4/2005 | Miyake | |
| 2005/0265517 A1 | 12/2005 | Gary | |
| 2005/0282300 A1 | 12/2005 | Yun et al. | |
| 2005/0286680 A1 | 12/2005 | Momose | |
| 2006/0062350 A1 | 3/2006 | Yokhin | |
| 2006/0088139 A1 | 4/2006 | Nankano et al. | |
| 2006/0120508 A1 | 6/2006 | Chen | |
| 2006/0169893 A1 | 8/2006 | Lee et al. | |
| 2006/0182322 A1 | 8/2006 | Bernhardt et al. | |
| 2007/0069154 A1 | 3/2007 | Sullivan | |
| 2007/0108387 A1 | 5/2007 | Yun et al. | |
| 2007/0183563 A1 | 8/2007 | Baumann | |
| 2007/0183579 A1 | 8/2007 | Baumann et al. | |
| 2007/0189449 A1 | 8/2007 | Baumann | |
| 2007/0248215 A1 | 10/2007 | Ohshima et al. | |
| 2007/0285643 A1 | 12/2007 | Wedowski et al. | |
| 2008/0043908 A1 | 2/2008 | Teramoto et al. | |
| 2008/0084966 A1 | 4/2008 | Aoki et al. | |
| 2008/0159475 A1 | 7/2008 | Mazor et al. | |
| 2008/0170662 A1 | 7/2008 | Reinhold | |
| 2008/0181363 A1 | 7/2008 | Fenter et al. | |
| 2008/0273662 A1 | 11/2008 | Yun | |
| 2009/0003516 A1 | 1/2009 | Chen et al. | |
| 2009/0052619 A1 | 2/2009 | Endoh | |
| 2009/0092227 A1 | 4/2009 | David | |
| 2009/0154640 A1 | 6/2009 | Baumann et al. | |
| 2009/0316857 A1 | 12/2009 | David et al. | |
| 2010/0061508 A1 | 3/2010 | Takahashi | |
| 2010/0091947 A1 | 4/2010 | Niu | |
| 2010/0172470 A1 | 7/2010 | Kuwabara | |
| 2010/0246765 A1 | 9/2010 | Murakoshi | |
| 2010/0260315 A1 | 10/2010 | Sato et al. | |
| 2010/0284513 A1 | 11/2010 | Kawabe | |
| 2010/0310041 A1 | 12/2010 | Adams et al. | |
| 2010/0329532 A1 | 12/2010 | Masuda et al. | |
| 2011/0206179 A1 | 8/2011 | Bendahan | |
| 2011/0222650 A1 | 9/2011 | Muenker | |
| 2011/0243702 A1 | 10/2011 | Murakoshi | |
| 2011/0261164 A1 | 10/2011 | Olesen et al. | |
| 2011/0268252 A1 | 11/2011 | Ozawa et al. | |
| 2012/0041679 A1 | 2/2012 | Stampanoni | |
| 2012/0224670 A1 | 9/2012 | Kiyohara et al. | |
| 2012/0228475 A1 | 9/2012 | Pang et al. | |
| 2013/0011040 A1 | 1/2013 | Kido et al. | |
| 2013/0039460 A1 | 2/2013 | Levy | |
| 2013/0108012 A1 | 5/2013 | Sato | |
| 2013/0108022 A1 | 5/2013 | Kugland et al. | |
| 2013/0202084 A1 | 8/2013 | Piorek et al. | |
| 2013/0251100 A1 | 9/2013 | Sasaki et al. | |
| 2013/0308112 A1 | 11/2013 | Clube et al. | |
| 2014/0023973 A1 | 1/2014 | Marconi et al. | |
| 2014/0037052 A1 | 2/2014 | Adler | |
| 2014/0064445 A1 | 3/2014 | Adler | |
| 2014/0072104 A1 | 3/2014 | Jacobsen et al. | |
| 2014/0105353 A1 | 4/2014 | Pfeiffer et al. | |
| 2014/0105363 A1 | 4/2014 | Chen et al. | |
| 2014/0112440 A1 | 4/2014 | David et al. | |
| 2014/0146945 A1 | 5/2014 | Fredenberg et al. | |
| 2014/0153692 A1 | 6/2014 | Larkin et al. | |
| 2014/0205057 A1 | 7/2014 | Koehler et al. | |
| 2014/0226785 A1 | 8/2014 | Stutman et al. | |
| 2014/0270060 A1 | 9/2014 | Date et al. | |
| 2015/0023472 A1 | 1/2015 | Schmitt et al. | |
| 2015/0030126 A1 | 1/2015 | Radicke | |
| 2015/0043713 A1 | 2/2015 | Chen | |
| 2015/0049860 A1 | 2/2015 | Das | |
| 2015/0051877 A1 | 2/2015 | Bakeman et al. | |
| 2015/0055743 A1 | 2/2015 | Vedantham et al. | |
| 2015/0055745 A1 | 2/2015 | Holzner et al. | |
| 2015/0071402 A1 | 3/2015 | Handa | |
| 2015/0117599 A1 | 4/2015 | Yun et al. | |
| 2015/0146847 A1 | 5/2015 | Liu | |
| 2015/0160354 A1 | 6/2015 | Mertens et al. | |
| 2015/0243397 A1 | 8/2015 | Yun et al. | |
| 2015/0247811 A1 | 9/2015 | Yun et al. | |
| 2015/0260663 A1 | 9/2015 | Yun et al. | |
| 2015/0270023 A1 | 9/2015 | Adler | |
| 2015/0323474 A1 | 11/2015 | Case et al. | |

(56) References Cited

U.S. PATENT DOCUMENTS

| | | |
|---|---|---|
| 2015/0323478 A1 | 11/2015 | Stutman |
| 2015/0357069 A1 | 12/2015 | Yun et al. |
| 2016/0047759 A1 | 2/2016 | Wang et al. |
| 2016/0066870 A1 | 3/2016 | Yun et al. |
| 2016/0091701 A1 | 3/2016 | Raghunathan |
| 2016/0109389 A1 | 4/2016 | Suzuki et al. |
| 2016/0178541 A1 | 6/2016 | Hwang et al. |
| 2016/0206259 A1 | 7/2016 | Auclair et al. |
| 2016/0341674 A1 | 11/2016 | Wu et al. |
| 2016/0351283 A1 | 12/2016 | Adler et al. |
| 2017/0038481 A1 | 2/2017 | Cheng et al. |
| 2017/0047191 A1 | 2/2017 | Yun et al. |
| 2017/0162288 A1 | 6/2017 | Yun et al. |
| 2017/0176356 A1 | 6/2017 | Hoffman et al. |
| 2017/0184520 A1 | 6/2017 | Mortensen et al. |
| 2017/0227476 A1 | 8/2017 | Zhang et al. |
| 2017/0234811 A1 | 8/2017 | Zhang et al. |
| 2017/0261442 A1 | 9/2017 | Yun et al. |
| 2017/0336334 A1* | 11/2017 | Yun .................. G01N 23/2076 |
| 2018/0182131 A1 | 6/2018 | Koehler et al. |
| 2018/0202951 A1 | 7/2018 | Yun et al. |
| 2018/0261352 A1 | 9/2018 | Matsuyama et al. |
| 2018/0306734 A1 | 10/2018 | Morimoto et al. |
| 2018/0323032 A1 | 11/2018 | Strelec et al. |
| 2018/0348151 A1 | 12/2018 | Kasper et al. |
| 2019/0011379 A1 | 1/2019 | Yun et al. |
| 2019/0017946 A1 | 1/2019 | Wack et al. |
| 2019/0027265 A1 | 1/2019 | Dey et al. |
| 2019/0064084 A1 | 2/2019 | Ullom et al. |
| 2019/0086342 A1 | 3/2019 | Pois et al. |
| 2019/0115184 A1 | 4/2019 | Zalubovsky |
| 2019/0145917 A1* | 5/2019 | Yun .................. H01J 35/14 378/53 |
| 2019/0172681 A1 | 6/2019 | Owen et al. |
| 2019/0204757 A1 | 7/2019 | Brussard et al. |
| 2019/0206652 A1 | 7/2019 | Akinwande et al. |
| 2019/0212281 A1 | 7/2019 | Shchgegrov |
| 2019/0216416 A1 | 7/2019 | Koehler et al. |
| 2019/0219713 A1 | 7/2019 | Booker et al. |
| 2019/0257774 A1 | 8/2019 | Seidler et al. |
| 2019/0261935 A1 | 8/2019 | Kitamura |
| 2019/0302042 A1 | 10/2019 | Yun et al. |
| 2019/0317027 A1 | 10/2019 | Tsuboi et al. |
| 2019/0331616 A1 | 10/2019 | Schaff et al. |
| 2019/0369271 A1 | 12/2019 | Yun et al. |
| 2019/0369272 A1 | 12/2019 | Yun et al. |
| 2019/0391087 A1 | 12/2019 | Matejka et al. |
| 2020/0003712 A1 | 1/2020 | Kataoka et al. |
| 2020/0041429 A1 | 2/2020 | Cho et al. |
| 2020/0072770 A1 | 3/2020 | Yun et al. |
| 2020/0088656 A1 | 3/2020 | Pois et al. |
| 2020/0090826 A1 | 3/2020 | Adler |
| 2020/0098537 A1 | 3/2020 | Yun et al. |
| 2020/0103358 A1 | 4/2020 | Wiell et al. |
| 2020/0155088 A1 | 5/2020 | Gruener et al. |
| 2020/0158662 A1 | 5/2020 | Horiba et al. |
| 2020/0182806 A1 | 6/2020 | Kappler et al. |
| 2020/0225172 A1 | 7/2020 | Sato et al. |
| 2020/0225173 A1 | 7/2020 | Sato et al. |
| 2020/0225371 A1 | 7/2020 | Greenberg et al. |
| 2020/0232937 A1 | 7/2020 | Yaroshenko et al. |
| 2020/0279351 A1 | 9/2020 | Ratner et al. |
| 2020/0292475 A1 | 9/2020 | Cao et al. |
| 2020/0300789 A1 | 9/2020 | Osakabe et al. |
| 2020/0300790 A1 | 9/2020 | Gellineau et al. |
| 2020/0303265 A1 | 9/2020 | Gellineau et al. |
| 2020/0319120 A1 | 10/2020 | Kitamura et al. |
| 2020/0337659 A1 | 10/2020 | Sano et al. |
| 2020/0378905 A1 | 12/2020 | Safai |
| 2020/0378908 A1 | 12/2020 | Fujimura et al. |
| 2020/0386696 A1* | 12/2020 | Sato .................. G01N 23/2209 |
| 2021/0055237 A1 | 2/2021 | Shchegrov et al. |
| 2021/0080408 A1 | 3/2021 | Yun et al. |
| 2021/0116399 A1 | 4/2021 | Ogata et al. |
| 2021/0236069 A1 | 8/2021 | Kotian |
| 2021/0255123 A1 | 8/2021 | Koskinen et al. |
| 2021/0356412 A1 | 11/2021 | Yun et al. |
| 2022/0003694 A1* | 1/2022 | Seidler .................. G01N 23/207 |
| 2022/0026377 A1 | 1/2022 | Yamamoto |
| 2022/0082515 A1 | 3/2022 | Yun et al. |
| 2022/0082516 A1* | 3/2022 | Yun .................. G01N 23/2206 |
| 2022/0178851 A1 | 6/2022 | Yun et al. |
| 2022/0404297 A1 | 12/2022 | Nii |
| 2023/0280291 A1 | 9/2023 | Yun et al. |
| 2023/0349842 A1 | 11/2023 | Yun et al. |
| 2024/0280515 A1 | 8/2024 | Yun et al. |
| 2025/0146960 A1* | 5/2025 | Yun .................. G01N 23/2076 |

FOREIGN PATENT DOCUMENTS

| | | |
|---|---|---|
| CN | 101257851 B | 9/2008 |
| CN | 101532969 B | 9/2009 |
| CN | 101566591 A | 10/2009 |
| CN | 101576515 A | 11/2009 |
| CN | 101413905 A | 3/2011 |
| CN | 102325498 B | 1/2012 |
| CN | 102507623 A | 6/2012 |
| CN | 102551761 A | 7/2012 |
| CN | 103604818 A | 2/2014 |
| CN | 104264228 A | 1/2015 |
| CN | 104068875 A | 5/2017 |
| CN | 206531787 U | 9/2017 |
| CN | 113218974 | 8/2021 |
| DE | 102007048743 A1 | 6/2010 |
| DE | 102013013344 A1 | 2/2015 |
| EP | 0751533 | 1/1997 |
| EP | 1169713 | 1/2006 |
| EP | 2592626 | 5/2013 |
| EP | 3168856 A2 | 5/2017 |
| JP | H01-097844 A | 4/1989 |
| JP | H04-285847 A | 10/1992 |
| JP | H06-188092 | 7/1994 |
| JP | H06-213833 A | 8/1994 |
| JP | H0721469 B2 * | 3/1995 |
| JP | H07-194592 | 8/1995 |
| JP | H07-311165 A | 11/1995 |
| JP | H08-061941 A | 3/1996 |
| JP | H08-128971 | 5/1996 |
| JP | H08-184572 | 7/1996 |
| JP | H09-166488 | 6/1997 |
| JP | H10-318737 A | 12/1998 |
| JP | H11-006804 A | 1/1999 |
| JP | H11-304728 | 11/1999 |
| JP | H11-352079 | 12/1999 |
| JP | 2001-021507 | 1/2001 |
| JP | 2001-124711 | 5/2001 |
| JP | 2001-235437 | 8/2001 |
| JP | 2002-214165 | 7/2002 |
| JP | 2003-149392 | 5/2003 |
| JP | 2003-329616 | 11/2003 |
| JP | 2004-333131 | 11/2004 |
| JP | 2005-233760 | 9/2005 |
| JP | 2006-501444 | 1/2006 |
| JP | 2007-212272 A | 8/2007 |
| JP | 2007-218683 | 8/2007 |
| JP | 2008-200359 | 4/2008 |
| JP | 2008-145111 | 6/2008 |
| JP | 2008-197495 | 8/2008 |
| JP | 2009-195349 | 3/2009 |
| JP | 2009-139337 | 6/2009 |
| JP | 2010-032341 A | 2/2010 |
| JP | 2010-236986 | 10/2010 |
| JP | 2011-033537 | 2/2011 |
| JP | 2011-095224 | 5/2011 |
| JP | 2011-107005 | 6/2011 |
| JP | 2011-218147 | 11/2011 |
| JP | 2012-032387 | 2/2012 |
| JP | 2007-309687 | 6/2012 |
| JP | 2012-112790 | 6/2012 |
| JP | 2012-112914 | 6/2012 |
| JP | 2012-187341 | 10/2012 |
| JP | H06-102399 A | 10/2012 |
| JP | 2012-254294 | 12/2012 |
| JP | 2013-042983 | 3/2013 |

(56) References Cited

FOREIGN PATENT DOCUMENTS

| | | |
|---|---|---|
| JP | 2013-096750 | 5/2013 |
| JP | 2013-113782 | 6/2013 |
| JP | 2013-181811 | 9/2013 |
| JP | 2015-047306 | 3/2015 |
| JP | 2015-072263 | 4/2015 |
| JP | 2015-077289 | 4/2015 |
| JP | 2017-040618 | 2/2017 |
| JP | 2019-078593 | 5/2019 |
| KR | 10-2004-0072780 | 8/2004 |
| KR | 10-2006-0088272 A | 8/2006 |
| KR | 10-2012-0012391 | 2/2012 |
| KR | 10-2012-0091591 A | 8/2012 |
| KR | 10-2014-0059688 | 5/2014 |
| WO | WO 1998/041992 | 9/1998 |
| WO | WO 2006/010091 | 1/2006 |
| WO | WO 2007/125833 | 11/2007 |
| WO | WO 2008/068044 | 6/2008 |
| WO | WO 2009/104560 | 8/2009 |
| WO | WO 2009/121932 | 10/2009 |
| WO | WO 2011/032572 | 3/2011 |
| WO | WO 2012/032950 | 3/2012 |
| WO | WO 2013/004574 | 1/2013 |
| WO | WO 2013/111050 | 8/2013 |
| WO | WO 2013/160153 | 10/2013 |
| WO | WO 2015/066333 | 5/2015 |
| WO | WO 2015/168473 | 11/2015 |
| WO | WO 2015/176023 | 11/2015 |
| WO | WO 2015/187219 | 12/2015 |
| WO | WO 2016/187623 | 11/2016 |
| WO | WO 2017/031740 | 3/2017 |
| WO | WO 2017/213996 | 12/2017 |
| WO | WO 2018/122213 | 7/2018 |
| WO | WO 2018/175570 | 9/2018 |

OTHER PUBLICATIONS

"High performance benchtop EDXRF spectrometer with Windows®® software," published by: Rigaku Corp., Tokyo, Japan; 2017.

Abramson et al., "hklhop: a Selection Tool for Asymmetric Reflections of Spherically Bent Crystal Analysers for High Resolution X-ray Spectroscopy," arXiv:2409.10698 (2024).

Altapova et al., "Phase contrast laminography based on Talbot interferometry," Opt. Express, vol. 20, No. 6, (2012) pp. 6496-6508.

Andreyev et al., "Boosting the versatility of X-ray microscopes by using robotic arm sample holders," 13th Conf. on Ind. Comp. Tomography, doi.org/10.58286/29261 (2024).

Anklamm et al., "A novel von Hamos spectrometer for efficient X-ray emission spectroscopy in the laboratory," Rev. Sci. Instr. vol. 85 p. 053110 (2014).

Arsana et al., "Laboratory Liquid-Jet X-ray Microscopy and X-ray Fluorescence Imaging for Biomedical Applications," Int'l J. Mol. Sci., Vo. 25, p. 920 (2024).

Bachucki et al., "Laboratory-based double X-ray spectrometer for simultaneous X-ray emission and X-ray absorption studies," J. Anal. Atomic Spectr. DOI:10.1039/C9JA00159J (2019).

Baron et al., "A compact optical design for Bragg reflections near backscattering," J. Synchrotron Rad., vol. 8 (2001), pp. 1127-1130.

Bauer et al., "Increasing the sensitivity of micro X-ray fluorescence spectroscopy through an optimized adaptation of polycapillary lenses to a liquid metal jet source," J. Anal. At. Spectrom. DOI:10.1039/d1ja00295c (2021).

Bech, "X-ray imaging with a grating interferometer," University of Copenhagen PhD. Thesis, (May 1, 2009).

Bech, "In-vivo dark-field and phase-contrast x-ray imaging," Scientific Reports 3, (2013), Article No. 03209.

Bertaux et al., "Sub-pixel high-resolution imaging of high-energy x-rays inspired by sub-wavelength optical imaging," Op. Express, vol. 29, No. 22-25, p. 35003 (2021).

Bertilson et al., "Analyzer-free Hard X-ray Interferometry," Phys. Med. Biol. https://doi.org/10.1088/1361-6560/ad1f84 (2024).

Birkholz, "Chapter 4: Grazing Incidence Configurations," Thin Film Analysis by X-ray Scattering (Wiley-VCH Verlag GmbH & Co. KGaA, Weinheim, Germany, 2006).

Birnbacher et al., "Quantitative X-ray phase contrast computed tomography with grating interferometry," European J. of Nucl. Med. and Mol. Imaging, https://doi.org/10.1007/s00259-021-05259-6 (2021).

Bogdanowicz et al., "Model-free measurement of lateral recess in gate-all-around transistors with micro hard-X-ray fluorescence," J. Micro/Nanopattern, Mater. Metrol., vol. 22(3), pp. 034001-1-034001-8 (2023).

Brombal et al., "PEPI Lab: a flexible compact multi-modal setup for X-ray phase-contrast and spectral imaging," Sci. Rep. 13, p. 4206, https://doi.org/10.1038/s41598-023-30316-5 (2023).

Buchanan et al., "Effective modelling of high-energy laboratory-based x-ray phase contrast imaging utilising absorption masks or gratings," J. Appl. Physics (accepted) (2020).

Celio et al., "Laboratory X-Ray-Assisted Device Alteration for Fault Isolation and Post-Silicon Debug," 2024 IEEE Int'l Reliability Physics Symp. (IRPS), doi: 10.1109/IRPS48228.2024.10529312 (2024).

Chen et al., "Advance in detection of low sulfur content by wavelength dispersive XRF," Proceedings of the Annual ISA Analysis Division Symposium (2002).

Chen et al., "A Ray Tracing Survey of Asymmetric Operation of the X-ray Rowland Circle Using Spherically Bent Crystal Analyzers," arXiv:2409.13119v1 (2024).

Coan et al., "In vivo x-ray phase contrast analyzer-based imaging for longitudinal osteoarthritis studies in guinea pigs," Phys. Med. Biol. vol. 55(24) (2010), pp. 7649-7662.

Cohen et al., "Tunable laboratory extended x-ray absorption fine structure system," Rev. Sci. Instr. vol. 51, No. 3, Mar. 1980, pp. 273-277.

Costin et al., "Combining a Computed Laminography Approach with Tomographic Analysis for a Study of Weld Joints," 9th Conf. on Ind. Comp. Tomography, Padova, Italy (ICT 2019), pp. 1-8 (2019).

David et al., "Hard X-ray phase imaging and tomography using a grating interferometer," Spectrochimica Acta Part B vol. 62 (2007) pp. 626-630.

Davis et al., "Bridging the Micro-to-Macro Gap: A New Application for Micro X-Ray Fluorescence," Microsc. Microanal., vol. 17(3) (Jun. 2011), pp. 410-417.

De Pauw et al., "A review of laboratory, commercially available, and facility based wavelength dispersive X-ray fluorescence spectrometers," J. Anal. At. Spectrom., doi: 10.1039/d3ja00315a (2023).

Detlefs et al., "Fast Chemical Contrast by X-ray Fluorescence Intensity Ratio Detection," Anal. Chem., https://doi.org/10.1021/acs.analchem.3c00623 (2023).

DeWulf et al., "Advances in the metrological traceability and performance of X-ray computed tomography," CIRP Annals—Manuf. Tech. vol. 00, 1-24 (2022).

Diaz et al., "Monte Carlo Simulation of Scatter Field for Calculation of Contrast of Discs in Synthetic CDMAM Images," In: Digital Mammography, Proceedings 10th International Workshop IWDM 2010 (Springer Verlag, Berlin Heidelberg), (2010), pp. 628-635 (9 pages).

DiBernardo, "Non-disruptive techniques for depth profiling in photoemission spectroscopy," Nature Review Physics, https://doi.org/10.1038/s42254-021-00331-4 (2021).

Dittler et al., "A mail-in and user facility for X-ray absorption near-edge structure: the CEI-XANES laboratory X-ray spectrometer at University of Washington," J. Synch. Rad. vol. 26, eight pages, (2019).

Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).

Dreier et al., "Improved resolution in advanced packaging metrology through advanced nano-focus X-ray sources," 2024 25th Int'l Conf. Elect. Packaging Tech. (ICEPT), doi: 10.1109/ICEPT63120.2024.10668783 (2024).

(56) References Cited

OTHER PUBLICATIONS

Dreier et al., "X-ray nano-tomography enabling sub-micron resolution failure analysis for advanced packaging," ISTFA 2024: Proc. From 50th Int'l Symp. for Testing and Failure Analysis Conf., https://doi.org/10.31399/asm.cp.istfa2024p0169 (2024).

Du et al., "Removal of artifacts caused by grating imperfections in X-ray phase contrast tomography," J. of Inst. vol. 16, P06039, doi.org/10.1088/1748-0221/16/06/P06039 (2021).

Erko et al., "X-ray Optics," Ch. 3 of "Handbook of Practical X-Ray Fluorescence Analysis," B. Beckhoff et al., eds. (Springer, Berlin, Germany, 2006), pp. 85-198.

Fahmi et al., "Biological applications of X-ray fluorescence microscopy: exploring the subcellular topography and speciation of transition metals," Current Opinion in Chem. Bio. vol. 11, pp. 121-127 (2007).

Feng et al., "Reduction of Compton Background Noise for X-ray Fluorescence Computed Tomography with Deep Learning," Photonics, vol. 9, p. 108 (2022).

Fernández-Ruiz, "TXRF Spectrometry as a Powerful Tool for the Study of Metallic Traces in Biological Systems," Development in Analytical Chemistry, vol. 1 (2014), pp. 1-14.

Fisher et al., "Laminography in the lab: imaging planar objects using a conventional x-ray CT scanner," Meas. Sci. Technol., vol. 30, p. 035401 (2019).

Flenner et al., "Hard X-ray full-field nanoimaging using a direct photon-counting detector," J. Synch. Rad., https://doi.org/10.1107/S1600577522012103 (2022).

Flenner et al., "Dual-beam X-ray nano-holotomography," J. Synch. Rad., https://doi.org/10.1107/51600577524003801 (2024).

Fraunhofer, "High-resolution computed laminography (HRCL) for electronic components," https://www.ikts.fraunhofer.de/en/departments/electronics_microsystems_biomedicine/condition_monitoring_nondestructive_testing/ndt_test_lab/3D-X-ray_inspection_industrial_components/computed_laminography _printed_circuit_board_inspection.html, (2024).

Gaur et al., "On the method of calibration of the energy dispersive EXAFS beamline and Indus-2 and fitting theoretical model to the EXAFS spectrum," Sadhana, vol. 36, No. 3 pp. 3390348 (2011).

Ge et al., "Investigation of the partially coherent effects in a 2D Talbot interferometer," Anal. Bioanal. Chem. vol. 401, (2011), pp. 865-870.

Ge et al., "Self-absorption correction on 2D X-ray fluorescence maps," Sci. Rep. 13, p. 7271, https://doi.org/10.1038/s41598-023-33383-w (2023).

Ghani et al., "A Phase Sensitive X-ray Brest Tomosynthesis System: Preliminary Patient Images with Cancer Legions," Phys. Med. Biol. https://doi.org/10.1088/1361-6560/ac2ea6 (2021).

Gironda et al., "Asymmetric Rowland circle geometries for spherically bent crystal analyzers in laboratory and synchrotron applications," J. Anal. At. Spectrom., doi: 10.1039/d3ja00437f (2024).

Gobo et al., "Grating-based spatial harmonic frequency X-ray imaging for quantitative characterization of structures with sub-detector spatial resolution," Measurement, doi:10.1016/j.measurement.2024.115601 (2024).

Greczynski et al., "Binding energy referencing in X-ray photoelectron spectroscopy," Nature Reviews Mat'ls, doi.org/10.1038/s41578-024-00743-5 (2024).

Graetz et al., "Lenseless X-ray Nano-Tomography down to 150 nm Resolution: On the Quantification of Modulation Transfer and Focal Spot of the Lab-based ntCT System," arXiv:2009.11749v1 [physics.ins-det] Sep. 24, 2020, 10 pages.

Gu et al., "A Breakthrough in Resolution and Scan Speed: Overcome the Challenges of 3D X-ray Imaging Workflows for Electronics Package Failure Analysis," 2023 IEEE Int'l Symp. Phys. and Failure Analysis of Integrated Circuits (IPFA), doi: 10.1109/IPFA58228.2023.10249028 (2023).

Günther et al., "Full-field structured-illumination super-resolution X-ray transmission microscopy," Nature Comm. 10:2494 (2019) and supplementary information.

Gustschin et al., "High resolution and sensitivity bi-directional x-ray phase contrast imaging using 2D Talbot array illuminators," arXiv:2105.07347v1 [physics.med-ph] May 16, 2021.

Harasse et al., "X-ray Phase Laminography with Talbot Interferometer", in Developments in X-Ray Tomography VII, Proc. SPIE vol. 7804 (2010), 780411.

Harasse et al., "Iterative reconstruction in x-ray computed laminography from differential phase measurements", Opt. Express. vol. 19 (2011), pp. 16560-16573.

Harasse et al., "X-ray Phase Laminography with a Grating Interferometer using Iterative Reconstruction", in International Workshop on X-ray and Neutron Phase Imaging with Gratings, AIP Conf. Proc. vol. 1466, (2012), pp. 163-168.

Hashimoto et al., "Improved reconstruction method for phase stepping data with stepping errors and dose fluctuations," Optics Express, vol. 28, No. 11, pp. 16363-16384 (2020).

Haug et al., "A laboratory-based multifunctional near ambient pressure X-ray photoelectron spectroscopy system for electrochemical, catalytic, and cryogenic studies," Rev. Sci. Instr. vol. 94, 065104, https://doi.org/10.1063/5.0151755 (2023).

Hayashi et al., "Wave-dispersive x-ray spectrometer for simultaneous acquisition of several characteristic lines based on strongly and accurately shaped Ge crystals," Rev. Sci. Instr. vol. 79, 033110 (2008).

Heirwegh et al., "The focused beam X-ray fluorescence elemental quantification software package PIQUANT," Spectrochimica Acta Part B: Atomic Spectroscopy, https://doi.org/10/1016/j.sab.2022.106520 (2022).

Helfen et al., :On the Implementation of computed laminography using synchrotron radiation, Rev. Sci. Instr. vol. 82, pp. 063702-1-063702-8 (2011).

Hemraj-Benny et al., "Near-Edge X-ray Absorption Fine Structure Spectroscopy as a Tool for Investigating Nanomaterials," Small, vol. 2(1), (2006), pp. 26-35.

Hennekam et al., "Trace metal analysis of sediment cores using a novel X-ray fluorescence core scanning method," Quaternary Int'l, https://doi.org/10.1016/j.quaint.2018.10.018 (2018).

Hirano et al., "X-ray zooming optics for analyzer-based multi-contrast computed tomography," J. Synch. Rad. vol. 29, https://doi.org/10.1107/S1600577522001412 (2022).

Holberg et al., "High-Resolution Table-Top NEXAFS Spectroscopy," Anal. Chem. https://10.1021/acs.analchem.1c04374 (2022).

Holden et al., "Probing Sulfur Chemical and Electronic Structure with Experimental Observation and Quantitative Theoretical Prediction of K# and Valence-to-Core K# X-ray Emission Spectroscopy," J. Phys. Chem. A doi: 10.1021/acs.jpca.0c04195 (2020).

Holfelder et al., "A double crystal von Hamos spectrometer for traceable x-ray emission spectroscopy," Rev. Sci. Instrum. vol. 92, p. 123105 (2021).

Hönlcke et al., "Reference-free X-ray fluorescence analysis with a micrometer-sized incident beam," Nanotechnology, https://doi.org/10.1088/1361-6528/ad3aff (2024).

Honma et al., Full-automatic XAFS Measurement System of the Engineering Science Research II beamline BL14B2 at Spring-8, 2011, AIP Conference Proceedings 1234, pp. 13-16.

Hoshino et al., "High-energy X-ray micro-laminography to visualize microstructures in dense planar object," J. Synch. Rad. https://doi.org/10.1107/S1600577522012176 (2022).

Hosseinzadeh et al., "Total-Ionizing-Dose Effects in Integrated Silicon Phase Shifters Using Localized X-Ray Pulses," IEEE Trans. Nucl. Sci., doi.org/10.1109/TNS.2024.3496297 (2024).

Howard et al., "High-Definition X-ray Fluorescence Elemental Mapping of Paintings," Anal. Chem., 2012, vol. 84(7), pp. 3278-3286.

Hu et al., "Improving small animal cone beam CT resolution by mitigating x-ray focal spot induced blurring via deconvolution," Phys. Med. Bio., in press, https://doi.org/10.1088/1361-6560/ac6b7a (2022).

Ide-Ektessabi et al., "The role of trace metallic elements in neurodegenerative disorders: quantitative analysis using XRF and XANES spectroscopy," Anal. Sci., vol. 21(7) (Jul. 2005), pp. 885-892.

(56) References Cited

OTHER PUBLICATIONS

Inoue et al., "Monolithic deformable mirror based on lithium niobate single crystal for high-resolution X-ray adaptive microscopy," Optica, vol. 11, No. 5, pp. 621-625 (2024).
Ishisaka et al., "A New Method of Analyzing Edge Effect in Phase Contrast Imaging with Incoherent X-rays," Optical Review, vol. 7, No. 6, (2000), pp. 566-572.
Ito et al., "A Stable In-Laboratory EXAFS Measurement System," Jap. J. Appl. Phys., vol. 22, No. 2, Feb. 1, 1983, pp. 357-360.
Itoh et al., "Two-dimensional grating-based X-ray phase-contrast imaging using Fourier transform phase retrieval," Op. Express, vol. 19, No. 4 (2011) pp. 3339-3346.
Janssens et al., "Recent trends in quantitative aspects of microscopic X-ray fluorescence analysis," TrAC Trends in Analytical Chemistry 29.6 (Jun. 2010): 464-478.
Jahrman et al., "Vacuum formed temporary spherically and toroidally bent crystal analyzers for x-ray absorption and x-ray emission spectroscopy," Rev. Sci. Inst. vol. 90, 013106 (2019).
Jiang et al., "X-Ray Phase-Contrast Imaging with Three 2D Gratings," Int. J. Biomed. Imaging, (2008), 827152, 8 pages.
Kalasová et al., "Characterization of a laboratory-based X-ray computed nanotomography system for propagation-based method of phase contrast imaging," IEEE Trans. on Instr. and Meas., DOI 10.1109/TIM.2019.2910338 (2019).
Kang et al., "Cold Cathode Flat Panel X-ray Source for Talbot-Lau Grating Interferometer using Zinc Oxide Nanowire Field Emitter Arrays and Periodic Microstructured Anode," ACS Appl. Nano Mater., doi.org/10.1021/acsanm.4c04410 (2024).
Keyrilainen et al., "Phase contrast X-ray imaging of breast," Acta Radiologica, vol. 51 (8), (2010), pp. 866-884.
Khan et al., "Recent Trends in Applications of X-ray Photoelectron Spectroscopy (XPS) Technique in Coatings for Corrosion Protection," Chapter of "Recent Developments in Analytical Techniques for Corrosion Research," I. Toor (ed.), Springer Nature Switzerland AG https://doi.org/10.1007/978-3-030-89101-5 8 (2022).
Kido et al., "Bone Cartilage Imaging with X-ray Interferometry using a Practical X-ray Tube", in Medical Imaging 2010: Physics of Medical Imaging, Proc. SPIE vol. 7622 (2010), 762240.
Kim, "Talbot images of wavelength-scale amplitude gratings," Opt. Express vol. 20(5), (2012), pp. 4904-4920.
Kim et al., "Observation of the Talbot Effect at Beamline 6C Bio Medical Imaging of the Pohang Light Source-II," J. Korean Phys. Soc., vol. 74, No. 10, pp. 935-940 (May 2019).
Kim et al., "A Simulation Study on the Transfer Characteristics of the Talbot Pattern Through Scintillation Screens in the Grating Interferometer," J. Rad. Sci. and Tech. 42(1), pp. 67-75 (2019).
Kiranjot et al., "Surface and interface characterization of Ru/C/Ru trilayer structure using grazing incidence X-ray reflectivity and X-ray fluorescence," Surf. and Interface Analysis, doi: 10.1002/sia7016 (2021).
Kiyohara et al., "Development of the Talbot-Lau Interferometry System Available for Clinical Use", in International Workshop on X-ray and Neutron Phase Imaging with Gratings, AIP Cong. Proc. vol. 1466, (2012), pp. 97-102.
Klockenkämper et al., "7.1 Instrumental Developments" and "7.3 Future Prospects by Combinations," from Chapter 7 of Total Reflection X-ray Fluorescence Analysis and Related Methods 2nd Ed. (J. Wiley and Sons, Hoboken, NJ, 2015).
Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).
Kottler et al., "A two-directional approach for grating based differential phase contrast imaging using hard x-rays," Opt. Express vol. 15(3), (2007), pp. 1175-1181.
Kottler et al., "Dual energy phase contrast x-ray imaging with Talbot-Lau interferometer," J. Appl. Phys. vol. 108(11), (2010), 114906.
Kroupa et al., "High contrast laminography using iterative algorithms," 12th Int'l Workshop on Rad. Imag. Detectors, doi: 10.1088/1748-0221/6/01/C01045 (2010).
Kulow et al., "On the Way to Full-Field X-ray Fluorescence Spectroscopy Imaging with Coded Apertures," J. Anal. At. Spectrom. Doi: 10.1039/C9JA00232D (2019).
Kutukova et al., "Laboratory High-Contrast X-ray Microscopy of Copper Nanostructures Enabled by a Liquid-Metal-Jet X-ray Source," Nanomaterials, vol. 14, p. 448 (2024).
Kuwabara et al., "Hard-X-ray Phase-Difference Microscopy with a Low-Brilliance Laboratory X-ray Source", Appl. Phys. Express vol. 4 (2011) 062502.
Leatham et al., "X-ray dark-field and phase retrieval without optics, via the Fokker-Planck equation," arXiv:2122.10999v1, physics.med-ph, Dec. 21, 2021.
Lei et al., "8-inch-diameter field of view for X-ray differential phase-contrast imaging," Nucl. Inst. and Methods in Physics Research A, https://doi.org/10.1016/j.nima.2021.165375 (2021).
Li et al., "X-ray phase-contrast imaging using cascade Talbot-Lau interferometers," Proc. SPIE 10964 (2018), pp. 1096469-1-1096469-6.
Liao et al., "Design of a full-filled transmission X-ray microscope with 30nm resolution," SPIE Proc. Publ., ChinaXiv:202311.00232v1 (2023).
Lin et al., "Quasi-Monte Carlo method for calculating X-ray scatter in CT," Op. Express, vol. 29, No. 9, p. 13746 (2021).
Lin et al., "High energy x-ray Talbot-Lau interferometer employing a microarray anode-structured target source to extend the field of view," Phys. Med. Biol., doi.org/10.1088/1361-6560/ad0196 (2023).
Lohmann et al., "An interferometer based on the Talbot effect," Optics Communications vol. 2 (1971), pp. 413-415.
Longo et al., "Flexible Plenoptic X-ray Microscopy," Photonics, vol. 9, p. 98 (2022).
Lübcke et al., "Soft X-ray nanoscale imaging using a sub-pixel resolution charge coupled device (CCD) camera," Rev. Sci. Instrum. vol. 90, 043111 (2019).
Lucht et al., "Phase retrieval beyond the homogeneous object assumption for X-ray in-line holographic imaging," arXiv:2403.00461v1 [eess.IV] (2024).
Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879, (2019).
Ma et al., "Exploration and Research of High Contrast and High Resolution Two-dimensional X-Ray Grids," Sixth Conf. Frontiers in Op. Imaging and Tech., Proc. SPIE vol. 13153, doi: 10.1117/12.3014459 (2024).
Maisl et al., "Computed Laminography for X-ray Inspection of Lightweight Constructions," 2nd Int'l Symp. on NDT in Aerospace 2010—Mo.3.A.3, https://www.ndt.net/?id+10375 (2010).
Mäkinen et al., "Optimization of contrast and dose in X-ray phase-contrast tomography with a Talbot-Lau interferometer," Biomed. Phys. Eng. Express, doi: 10.1088.2057-1976/ad5206 (2024).
Malzer et al., "A laboratory spectrometer for high throughput X-ray emission spectroscopy in catalysis research," Rev. Sci. Inst. 89, 113111 (2018).
Mamyrbayev et al., "Staircase array of inclined refractive multi-lenses for large field of view pixel super-resolution scanning transmission hard X-ray microscopy," J. Synch. Rad., vol. 28 https://doi.org/10.1107/S1600577521001521 (2021).
Masteghin et al., "Benchmarking of X-Ray Fluorescence Microscopy with Ion Beam Implanted Samples Showing Detection Sensitivity of Hundreds of Atoms," Small Methods, doi: 10.1002/smtd.202301610 (2024).
Matsunaga et al., "Development of projection X-ray microscope with 10 nm spot size," Nodestr. Test. and Eval., https://doi.org.10.1080/10589759.2022.2083616 (2022).
Matsuyama et al., "Wavefront measurement for a hard-X-ray nanobeam using single-grating interferometry", Opt. Express vol. 20 (2012), pp. 24977-24986.
Matveevskii et al., "Laboratory-based 3D X-ray standing-wave analysis of nanometre-scale gratings," J. Appl. Crystallography, vol. 57, doi.org/10.1107/S1600576724007179 (2024).
McRae et al., "In Situ Imaging of Metals in Cells and Tissues," Chem Rev. vol. 109, doi:10.1021/cr900223a (2009).

(56) References Cited

OTHER PUBLICATIONS

Menzies et al., "Dual source X-ray and electron SEM system: Elemental mapping of an Epithermal gold-bearing sample from Karangahake, New Zealand," Microsc. Microanal., vol. 27 (Suppl. 1), pp. 456 (2021).
Miao et al., "Motionless phase stepping in X-ray phase contrast imaging with a compact source," Proceedings of the National Academy of Sciences, vol. 110(48), (2013), pp. 19268-19272.
Miao et al., "A four-grating interferometer for x-ray multi-contrast imaging," Med. Physics, doi: 10.1002/mp.17052 (2024).
Mijovilovich et al., "Analysis of trace metal distribution in plants with lab-based microscopic X-ray fluorescence imaging," Plant Methods, vol. 16, No. 82, 21 pages (2020).
Mizutani et al., X-ray microscopy for neural circuit reconstruction in 9th International Conference on X-Ray Microscopy, J. Phys: Conf. Ser. 186 (2009) 012092.
Modregger et al., "Grating-Based X-ray Phase Contrast Imaging," Ch. 3 of Emerging Imaging Technologies in Medicine, M. Anastasio & P. La Riviere, ed., CRC Press, Boca Raton, FL, (2012), pp. 43-56.
Momose et al., "Phase-Contrast X-Ray Imaging Using an X-Ray Interferometer for Biological Imaging", Analytical Sciences vol. 17 Supplement (2001), pp. i527-i530.
Momose et al., "Demonstration of X-Ray Talbot Interferometry", Jpn. J. Appl. Phys. vol. 42 (2003), pp. L866-L868.
Momose et al., "Phase Tomography Using an X-ray Talbot Interferometer", in Developments in X-Ray Tomography IV, Proc. SPIE vol. 5535 (2004), pp. 352-360.
Momose, "Recent Advances in X-ray Phase Imaging", Jpn. J. Appl. Phys. vol. 44 (2005), pp. 6355-6367.
Momose et al., "Biomedical Imaging by Talbot-Type X-Ray Phase Tomography" in Developments in X-Ray Tomography V, Proc. SPIE vol. 6318 (2006) 63180T.
Momose et al., "Phase Tomography by X-ray Talbot Interferometry for Biological Imaging" Jpn. J. Appl. Phys. vol. 45 2006 pp. 5254-5262.
Momose et al., "X-ray Talbot Interferometry with Capillary Plates", Jpn. J. Appl. Phys. vol. 45 (2006), pp. 314-316.
Momose et al., "Phase Imaging with an X-ray Talbot Interferometer", Advances in X-ray Analysis vol. 49(3) (2006), pp. 21-30.
Momose et al., "Phase Tomography Using X-ray Talbot Interferometer", in Synchrotron Radiation Instrumentation: Ninth International Conference, AIP Conf. Proc. vol. 879 (2007), pp. 1365-1368.
Momose et al., "Sensitivity of X-ray Phase Imaging Based on Talbot Interferometry", Jpn. J. Appl. Phys. vol. 47 (2008), pp. 8077-8080.
Momose et al., "Grating-Based X-ray Phase Imaging Using Multiline X-ray Source", Jpn. J. Appl. Phys. vol. 48 (2009), 076512.
Momose et al., "X-ray phase tomography with a Talbot interferometer in combination with an X-ray imaging microscope", in 9th International Conference on X-Ray Microscopy, J. Phys: Conf. Ser. 186 (2009) 012044.
Momose et al., "High-speed X-ray phase imaging and X-ray phase tomography with Talbot interferometer and white synchrotron radiation", Opt. Express vol. 17 (2009), pp. 12540-12545.
Momose et al., "X-Ray Phase Imaging with Talbot Interferometry", in "Biomedical Mathematics: Promising Directions in Imaging, Therapy Planning, and Inverse Problems", Y. Censor, M. Jiang & G. Wang, eds. (Medical Physics Publishing, Madison, WI, USA, 2010), pp. 281-320.
Momose et al., "X-ray Phase Measurements with Talbot Interferometry and Its Applications", in International Conference on Advanced Phase Measurement Methods in Optics and Imaging, AIP Conf. Proc. vol. 1236 (2010), pp. 195-199.
Momose et al., "X-ray Phase Imaging Using Lau Effect", Appl. Phys. Express vol. 4 (2011) 066603.
Momose et al., "Four-dimensional X-ray phase tomography with Talbot interferometry and white synchrotron radiation: dynamic observation of a living worm", Opt. Express vol. 19 (2011), pp. 8423-8432.
Momose et al., "X-ray Phase Imaging—From Static Observation to Dynamic Observation-", in International Workshop on X-ray and Neutron Phase Imaging with Gratings AIP Conf. Proc. vol. 1466, (2012), pp. 67-77.
Momose et al., "Recent Progress in X-ray and Neutron Phase Imaging with Gratings," Quantum Beam Science, vol. 4, No. 9; doi:10.3390/qubs4010009 (2020).
Momose et al., "Development of grating-based super-resolution x-ray phase imaging," AIP Conf. Proc. 2990, 030003 (2023).
Momose et al., "Signal enhancement in X-ray Talbot interferometry with a pair of concave and convex parabolic phase gratings," Appl. Phys. Express, doi.org/10.35848/1882-0786/ad9665 (2024).
Morimoto et al., "X-ray phase contrast imaging by compact Talbot-Lau interferometer with a signal transmission grating," 2014, Optics Letters, vol. 39, No. 15, pp. 4297-4300.
Morimoto et al., "Design and demonstration of phase gratings for 2D single grating interferometer," Optics Express vol. 23, No. 23, 29399 (2015).
Morvay, "Chemical composition depth profiling of thin films using x-ray reflectometry and fluorescence," Ph.D. thesis, Masaryk University, Brno, Czech Republic (2024).
Munro et al., Design of a novel phase contrast imaging system for mammography, 2010, Physics in Medicine and Biology, vol. 55, No. 14, pp. 4169-4185.
Nakamura et al., "Nanoscale X-ray Tomography of Integrated Circuits using a Hybrid Electron/X-ray Microscope: Results and Prospects," 2023 IEEE Phys. Assurance and Inspection of Electron., doi: 10.1109/PAINE58317.2023.10318004 (2023).
Nango et al., "Talbot-defocus multiscan tomography using the synchrotron X-ray microscope to study the lacuno-canalicular network in mouse bone", Biomed. Opt. Express vol. 4 (2013), pp. 917-923.
Nemeth et al., "Laboratory von Hamos X-ray Spectroscopy for Routine Sample Characterization," arvix:1607.08045v1 (2016).
Neuhausler et al., "Non-destructive high-resolution X-ray imaging of ULSI micro-electronics using keV X-ray microscopy in Zernike phase contrast," Microelectronic Engineering, Elsevier Publishers BV., Amsterdam, NO, vol. 83, No. 4-9 (Apr. 1, 2006) pp. 1043-1046.
Newville, "Fundamentals of XAFS," (Univ. of Chicago, Chicago, IL, Jul. 23, 2004).
Novichkov et al., "Laboratory-based X-ray spectrometer for actinide science," J. Synch. Rad. vol. 30, doi.org/10.1107/S1600577523006926 (2023).
Nykanen et al., "X-ray scattering in full-field digital mammography," Med. Phys. vol. 30(7), (2003), pp. 1864-1873.
O'Brien et al., "Recent Advances in X-ray Cone-beam Computed Laminography," J. X-ray Sci. and Tech., vol. 24, No. 5, pp. 691-707 (2016).
Ohba et al., "Laboratory-size x-ray microscope using Wolter mirror optics and an electron-impact x-ray source," Rev. Sci. Inst. 92, 093704 (2021).
Oji et al., Automatic XAFS measurement system developed at BL14B2 in SPring-8, Available online Nov. 15, 2011, Journal of Synchrotron Radiation, vol. 19, pp. 54-59.
Okolo, "A guide into the world of high-resolution 3D imaging: the case of soft X-ray tomography for the life sciences," Biochem. Soc. Trans., https://doi.org/10.1042/BST20210886 (2002).
Olbinado et al., "Demonstration of Stroboscopic X-ray Talbot Interferometry Using Polychromatic Synchrotron and Laboratory X-ray Sources", Appl. Phys. Express vol. 6 (2013), 096601.
Ortega et al., "Bio-metals imaging and speciation in cells using proton and synchrotron radiation X-ray microspectroscopy," J. Royal Society Interface vol. 6 suppl. 5 (Oct. 6, 2009), pp. 6S649-6S658.
Pandeshwar et al., "Envelope modulated x-ray grating interferometry," Appl. Phys. Lett. 120, 193701 (2022).
Pandeshwar et al., "Modeling of beam hardening effects in a dual-phase X-ray grading interferometer for quantitative dark-field imaging," Optics Express, vol. 28, No. 13, Jun. 22, 2020, pp. 19187-19204 (2020).

(56) References Cited

OTHER PUBLICATIONS

Parrill et al., "GISAXS—Glancing Incidence Small Angle X-ray Scattering," Journal de Physique IV, vol. 3 (Dec. 1993), pp. 411-417.
Paunesku et al., "X-Ray Fluorescence Microprobe Imaging in Biology and Medicine," J. Cell. Biochem. vol. 99, pp. 1489-1502 (2006).
Pekel et al., "Geometric calibration of seven degree of freedom robotic sample holder for x-ray CT," Proc. of SPIE 12304, 7th Int'l Conf. on Image Formation in X-Ray Computed Tomography, 123042L, doi:10.1117/12.2646492 (2022).
Pfeiffer et al., "Phase retrieval and differential phase-contrast imaging with low-brilliance X-ray sources," Nature Physics vol. 2, (2006), pp. 258-261.
Pfeiffer et al., "Hard x-ray phase tomography with low brilliance x-ray sources," Phys. Rev. Lett. vol. 98, (2007), 108105.
Pfeiffer et al., "Hard-X-ray dark-field imaging using a grating interferometer," Nature Materials vol. 7, (2008), pp. 134-137.
Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.
Pianetta et al., "Application of synchrotron radiation to TXRF analysis of metal contamination on silicon wafer surfaces," Thin Solid Films, vol. 373(1-2), 2000, pp. 222-226.
Pieper et al., "Total-Ionizing Dose Damage from X-Ray PCB Inspection Systems," 2024 IEEE Int'l Reliability Physics Symp. (IRPS), doi: 10.1109/IRPS48288.2024.10529337 (2024).
Potts, "Electron Probe Microanalysis", Ch. 10 of "A Handbook of Silicate Rock Analysis" (Springer Science + Business Media, New York, 1987), pp. 326-382.
Prewett et al., "Focused ion beam repair: staining of photomasks and reticles," J. Phys. D Appl. Phys. vol. 26 (1993), pp. 1135-1137.
Prewett et al., "Gallium Staining in FIB Repair of Photomasks," Microelectronic Engineering, vol. 21 (1993), pp. 191-196.
Prewett et al., "FIB Repair of 5X Reticles and Effects on IC Quality," Integrated Circuit Metrology, Inspection, and Process Control VII, Proc. SPIE vol. 1926 (1993), pp. 517-526.
Pushie et al., "Prion protein expression level alters regional copper, iron and zinc content in the mouse brain," Metallomics vol. 3, 206-214 (2011).
Pushie et al., "Elemental and Chemically Specific X-ray Fluorescence Imaging of Biological Systems," Chem. Rev. 114:17, 8499-8541 (2014).
Qiao et al., "Single-shot x-ray phase-contrast and dark-field imaging based on coded binary phase mask," Appl. Phys. Lett. 119, 011105 (2021).
Qin et al., "Trace metal imaging with high spatial resolution: Applications in biomedicine," Metallomics, vol. 3 (Jan. 2011), pp. 28-37.
Redus et al., "Spectrometer configuration and measurement uncertainty in X-ray spectroscopy," X-Ray Spectrom., pp. 1-14 (2020).
Renaud et al., "Probing surface and interface morphology with Grazing Incidence Small Angle X-ray Scattering," Surface Science Reports, vol. 64:8 (2009), pp. 255-380.
Rix et al., "Super-Resolution X-ray phase-contrast and dark-field imaging with a single 2D grating and electromagnetic source stepping," Phys. Med. Biol. in press https://doi.org/10.1088/1361-6560/ab2ff5 (2019).
Rutishauser, "X-ray grating interferometry for imaging and metrology," 2003, Eth Zurich, Diss. Eth No. 20939.
Sato et al., Two-dimensional gratings-based phase-contrast imaging using a conventional x-ray tube, 2011, Optics Letters, vol. 36, No. 18, pp. 3551-3553.
Scherer et al., "Bi-Directional X-Ray Phase-Contrast Mammography," PLoS ONE, vol. 9, Issue 5 (May 2014) e93502.
Scholze et al., "X-ray Detectors and XRF Detection Channels," Ch. 4 of "Handbook of Practical X-Ray Fluorescence Analysis," B. Beckhoff et al., eds. (Springer, Berlin Heidelberg, Germany, 2006), pp. 85-198.
Schunck et al., "Soft x-ray imaging spectroscopy with micrometer resolution," Optica vol. 8, No. 2, pp. 156-160 (2021).
Seddon-Ferretti et al., "Hermes—a GUI-based software tool for pre-processing of X-rayabsorption spectroscopy data from laboratory Rowland circle spectrometers," J. Synch. Rad., vol. 29, https://doi.org/10.1107/S1600577521012583, pp. 1-4 (2022).
Sefi et al., "25-Fold Resolution Enhancement of X-ray Microscopy Using Multipixel Ghost Imaging," arXiv:2402.14023 (2024).
Seifert et al., "Talbot-Lau x-ray phase-contrast setup for fast scanning of large samples," Sci. Rep. 9:4199, pp. 1-11 (2019).
Shafkat et al., "Assessing Compatibility of Advanced IC Packages to X-Ray Based Physical Inspection," Elec. Device Failure Analysis, vol. 26, No. 3, pp. 14-24 (2024).
Shi et al., "Laboratory X-ray interferometry imaging with a fan-shaped source grating," Optics Lett., doi.org/10.1364/OL.426867 (2021).
Shimamura et al., "Soft X-ray nanobeams formed by aberration-reduced elliptical mirrors with large numerical aperture," Opt. Express, vol. 31, No. 23, 38132 (2023).
Shimura et al., "Hard x-ray phase contrast imaging using a tabletop Talbot-Lau interferometer with multiline embedded x-ray targets", Opt. Lett. vol. 38(2) (2013), pp. 157-159.
Simionovici et al., "X-ray focusing methods for X-ray absorption spectroscopy," Int'l Tables Crystallog. vol. I, https://doi.org/10.1107/S1574870721006844 (2022).
Six et al., "Joint multi-contrast CT for edge illumination X-ray phase contrast imaging using split Barzilai-Borwein steps," Op. Express, vol. 32, No. 2, pp. 1135-1150 (2024).
Soltau et al., "Coherent Diffractive Imaging with Diffractive Optics," Phys. Rev. Lett. 128, 223901 (2022).
Sparks Jr., "X-ray Fluorescence Microprobe for Chemical Analysis," in Synchrotron Radiation Research, H. Winick & S. Doniach, eds. (Plenum Press, New York, NY 1980), pp. 459-512.
Stampanoni et al., "The First Analysis and Clinical Evaluation of Native Breast Tissue Using Differential Phase-Contrast Mammography," Investigative Radiology, vol. 46, pp. 801-806. pub 2011-12-xx.
Storm et al., "Optimizing the energy bandwidth for transmission full-field X-ray microscopy experiments," J. Synch. Rad., vol. 29, https://doi.org/10.1107/S1600577521011206, pp. 1-10 (2022).
Streli et al., "Micro-X-ray fluorescence spectroscopy," Chapter 1.9.f of "Imaging Modalities for Biological and Preclinical Research: A compendium, vol. 1, Part I: Ex vivo biological imaging," Ed. Walter et al., 8 pages, doi:10.1088/978-0-7503-3059-6ch42 (2021).
Su et al., "Quantitative Dual-Energy X-ray Imaging Based on K-Edge Absorption Difference," J. Phys. Chem. Lett. vol. 14, pp. 10074-10079 (2023).
Sunday et al., "X-ray Metrology for the Semiconductor Industry Tutorial," J. Res. Nat'l Inst. Stan. vol. 124: 124003 (2019); https://doi.org/10.6028/jres.124.003.
Takeda et al., "X-Ray Phase Imaging with Single Phase Grating", Jpn. J. Appl. Phys. vol. 46 (2007), pp. L89-L91.
Takeda et al., "Differential Phase X-ray Imaging Microscopy with X-ray Talbot Interferometer" Appl. Phys. Express vol. 1 (2008) 117002.
Talbot, "Facts relating to optical science No IV," Philos. Mag. vol. 9 (1836), pp. 401-407.
Tanaka et al., "Cadaveric and in vivo human joint imaging based on differential phase contrast by X-ray Talbot-Lau interferometry", Z. Med. Phys. vol. 23 (2013), pp. 222-227.
Tanaka et al., "Propagation-based phase-contrast imaging method for full-field X-ray microscopy using advanced Kirkpatrick-Baez mirrors," Op. Express vol. 31, No. 16, pp. 26135-26144 (2023).
Tang et al., "Detailed analysis of the interference patterns measured in lab-based X-ray dual-phase grating interferometry through wave propagation simulation," Opt. Ex. vol. 31, No. 2, pp. 1677-1691 (2023).
Tao et al., "Moire artifacts reduction in Talbot-Lau X-ray phase contrast imaging using a three-step iterative approach," Opt. Ex. Vol. 30, No. 20, pp. 35096-35111 (2022).
Tao et al., "Factors Affecting the Spatial Resolution in 2D Grating-Based X-Ray Phase Contrast Imaging," Frontiers in Physics, doi: 10.3389/fphy.2021.672207 (2021).

(56) References Cited

OTHER PUBLICATIONS

Taphorn et al., "Grating-based spectral X-ray dark-field imaging for correlation with structural size measures," Sci. Reports, vol. 10, 13195 (2020).
Tebina et al., "X-Ray Fault Injection: Reviewing Defensive Approaches from a Security Perspective," 2022 IEEE Int'l Symp. Defect and Fault Tolerances in VLSI and Nanotechnology Systems (DFT), doi: 10.1109/DFT56152.2022.9962362 (2022).
Terzano et al., Recent advances in analysis of trace elements in environmental samples by X-ray based techniques (IUPAC Technical Report), Pure Appl. Chem. 2019.
Tessarini et al., "Semi-classical Monte Carlo algorithm for the simulation of X-ray grating interferometry," Sci. Rep. vol. 12, p. 2485 (2022).
Tetef et al., "Unsupervised Machine Learning for Unbiased Chemical Classification in X-ray Absorption Spectroscopy and X-ray Emission Spectroscopy," Royal Soc. of Chem. Doi: 10.33774/chemrxiv-2021-5tvrv (2021).
Titus et al., "Advancing the in-situ characterization of light elements via X-ray absorption spectroscopy using superconducting detectors," Microsc. Microanal., vol. 27, (Suppl. 1), pp. 2890 (2021).
Tkachuk et al., "High-resolution x-ray tomography using laboratory sources", in Developments in X-Ray Tomography V, Proc. SPIE 6318 (2006): 631810.
Tkachuk et al., "Multi-length scale x-ray tomography using laboratory and synchrotron sources", Microsc. Microanal. vol. 13 (Suppl. 2) (2007), pp. 1570-1571.
Töpperwien et al., "Multiscale x-ray phase-contrast tomography in a mouse model of transient focal cerebral ischemia," Biomed. Op. Express, vol. 10, No. 1, Jan. 2019, pp. 92-103.
Tsuji et al., "X-Ray Spectrometry: Recent Technological Advances," John Wiley & Sons Ltd. Chichester, West Sussex, UK 2004), Chapters 1-7.
Udagawa, "An Introduction to In-House EXAFS Facilities," The Rigaku Journal, vol. 6, (1) (1989), pp. 20-27.
Udagawa, "An Introduction to X-ray Absorption Fine Structure," The Rigaku Journal, vol. 11(2)(1994), pp. 30-39.
Uehara et al., "Effectiveness of X-ray grating interferometry for non-destructive inspection of packaged devices", J. Appl. Phys. vol. 114 (2013), 134901.
Viermetz et al., "High resolution laboratory grating-based X-ray phase-contrast CT," Scientific Reports 8:15884 (2018).
Vila-Comamala et al., "High sensitivity X-ray phase contrast imaging by laboratory grating-based interferometry at high Talbot order geometry," Op. Express vol. 29, No. 2, pp. 2049-2064 (2021).
Villarraga-GÓMez et al., "Assessing Electronic Devices with Advanced 3D X-ray Imaging and Electron Microscopy" (2023).
Villarraga-GÓMez et al., "Assessing Electronics with Advanced 3D X-ray Imaging Techniques, Nanoscale Tomography, and Deep Learning," J. Fail. Anal. and Preven., https://doi.org/10.1007/s11668-024-01989-5 (2024).
Vogt, "X-ray Fluorescence Microscopy: A Tool for Biology, Life Science and Nanomedicine," Presentation on May 16, 2012 at James Madison Univ., Harrisonburg, VA (31 slides), 2012.
Wan et al., "Fabrication of Multiple Slit Using Stacked-Sliced Method for Hard X-ray Talbot-Lau Interferometer", Jpn. J. Appl. Phys. vol. 47 (2008), pp. 7412-7414.
Wang et al., "Advantages of intermediate X-ray energies in Zernike phase contrast X-ray microscopy," Biotech. Adv., vol. 31 (2013) pp. 387-392.
Wang, "Recent advances in X-ray grating-based dark-field imaging," Trends in Analytical Chemistry, doi.org/10.1016/j.trac.2024.118052 (2024).
Watanabe et al., "X-ray fluorescence micro-tomography and laminography using an x-ray scanning microscope," J. Phys: Conf. Series 186, 012022 (2009).
Watts et al., "The development of laboratory-based high energy sources for XPS," Surf. Interface Anal., pp. 1-17, doi:10.1002/sia.7300 (2023).
Weitkamp et al., "Hard X-ray phase imaging and tomography with a grating interferometer," Proc. SPIE vol. 5535, (2004), pp. 137-142.
Weitkamp et al., "X-ray phase imaging with a grating interferometer," Opt. Express vol. 13(16), (2005), pp. 6296-6304.
Weitkamp et al., "X-ray wavefront analysis and optics characterization with a grating interferometer," Appl. Phys. Lett. vol. 86, (2005), 054101.
Weitkamp et al., Tomography with grating interferometers at low-brilliance sources, 2006, SPIE, vol. 6318, pp. OS-1 to OS-10.
Weitkamp et al., "X-ray wavefront diagnostics with Talbot interferometers," International Workshop on X-Ray Diagnostics and Scientific Application of the European XFEL, Ryn, Poland, (2010), 36 slides.
Weitkamp et al., "Design aspects of X-ray grating interferometry," in International Workshop on X-ray and Neutron Phase Imaging with Gratings AIP Conf. Proc. vol. 1466, (2012), pp. 84-89.
Wen et al., "Fourier X-ray Scattering Radiography Yields Bone Structural Information," Radiology, vol. 251 (2009) pp. 910-918.
Wen et al., "Single-shot x-ray differential phase-contrast and diffraction imaging using two-dimensional transmission gratings," Op. Lett. vol. 35, No. 12, (2010) pp. 1932-1934.
Wirtensohn et al., "The Dark Side of Transmission X-Ray Microscopy," arXiv:2403.18884v1 [physics.optics[ Mar. 27, 2024.
Wirtensohn et al., "Nanoscale dark-field imaging in full-field transmission X-ray microscopy," Optica vol. 11, No. 6, doi.org/10.1364/optica.524812 (2024).
Wilde et al., "Modeling of an X-ray grating-based imaging interferometer using ray tracing," Op. Express vol. 28, No. 17, p. 24657 (2020).
Wilde et al., "Statistical optics modeling of dark-field scattering in X-ray grating interferometers: Part 1. Theory," Op. Express vol. 29, No. 25, p. 40891 (2021).
Wilde et al., "Statistical optics modeling of dark-field scattering in X-ray grating interferometers: Part 2. Simulation," Op. Express vol. 29, No. 25, p. 40917 (2021).
Withers et al., "X-ray computed tomography," Nature Reviews | Methods Primers, vol. 1, No. 18, pp. 1-21 (2021).
Witte et al., "From 2D STXM to 3D Imaging: Soft X-ray Laminography of Thin Specimens," Nano Lett. vol. 20, pp. 1305-1314 (2020).
Wittry et al., "Properties of fixed-position Bragg diffractors for parallel detection of x-ray spectra," Rev. Sci. Instr. vol. 64, pp. 2195-2200 (1993).
Wobrauschek et al., "Micro XRF of light elements using a polycapillary lens and an ultra-thin window Silicon Drift Detector inside a vacuum chamber," 2005, International Centre for Diffraction Data 2005, Advances in X-ray Analysis, vol. 48, pp. 229-235.
Wobrauschek et al., "Energy Dispersive, X-Ray Fluorescence Analysis," Encyclopedia of Analytical Chemistry, R.A. Meyers, Ed. (Wiley 2010).
Woicik et al., "Soft X-ray absorption spectra," Int. Tables Crystallogr. vol. 1, https://doi.org.10.1107/51574870720008484 (2023).
Xiao et al., "TXM-Sandbox: an open-source software for transmission X-ray microscopy data analysis," J. Synch. Rad., vol. 29, https://doi.org/10.1107/S1600577521011978, p. 1-10 (2022).
Xu et al., "Synchrotron radiation computed laminography for polymer composite failure studies," J. Synch. Rad., vol. 17, pp. 222-226 (2010).
Xu et al., "Comparison of image quality in computed laminography and tomography," Op. Express, vol. 20, No. 2, pp. 794-806 (2012).
Xu et al., "A versatile high-speed x-ray microscope for sub-10 nm imaging," Rev. Sci. Instr. vol. 95, p. 113705, doi.org/10.1063/5.0225904 (2024).
Yamada et al., "Compact full-field hard x-ray microscope based on advanced Kirkpatrick-Baez mirrors," Optica, vol. 7, No. 4 pp. 367-370 (2020).
Yang et al., "Non-linear super-resolution computed tomography imaging algorithm based on a discrete X-ray source focal spot model," Op. Express, vol. 32, No. 25, pp. 44452-44477 (2024).
Yashiro et al., "Optimal Design of Transmission Grating for X-ray Talbot Interferometer", Advances in X-ray Analysis vol. 49(3) (2006), pp. 375-379.

(56) References Cited

OTHER PUBLICATIONS

Yashiro et al., "Efficiency of capturing a phase image using cone-beam x-ray Talbot interferometry", J. Opt. Soc. Am. A vol. 25 (2008), pp. 2025-2039.
Yashiro et al., "Hard-X-Ray Phase-Difference Microscopy Using a Fresnel Zone Plate and a Transmission Grating", Phys. Rev. Lett. vol. 103 (2009), 180801.
Yashiro et al., "Hard x-ray phase-imaging microscopy using the self-imaging phenomenon of a transmission grating", Phys. Rev. A vol. 82 (2010), 043822.
Yashiro et al., "On the origin of visibility contrast in x-ray Talbot interferometry", Opt. Express (2010), pp. 16890-16901.
Yashiro et al., "X-ray Phase Imaging Microscopy using a Fresnel Zone Plate and a Transmission Grating", in the 10th International Conference on Synchrotron Radiation Instrumentation, AIP Conf. Proc. vol. 1234 (2010), pp. 473-476.
Yashiro et al., "Distribution of unresolvable anisotropic microstructures revealed in visibility-contrast images using x-ray Talbot interferometry", Phys. Rev. B vol. 84 (2011), 094106.
Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.
Yashiro et al., "Theoretical Aspect of X-ray Phase Microscopy with Transmission Gratings" in International Workshop on X-ray and Neutron Phase Imaging with Gratings, AIP Conf. Proc. vol. 1466, (2012), pp. 144-149.
Yoshioka et al., "Imaging evaluation of the cartilage in rheumatoid arthritis patients with an x-ray phase imaging apparatus based on Talbot-Lau interferometry," Scientific Reports, 10:6561, https://doi.org/10.1038/s41598-020-63155-9 (2020).
Yuan at al., "Micro X-ray fluorescence device based on monocapillary ellipsoidal lens for thin film thickness measurements," Nucl. Inst. Meth. Phys. Res. A, vol. 1058, p. 168923 (2024).
Yuan et al., "Performance characterization of an Al2O3/HfO2 parabolic multilayer based on a laboratory X-ray source," Appl. Op. vol. 63, No. 22 https://doi.org/10.1364/AO.531983 (2024).
Zan et al., "High-resolution multicontrast tomography with an X-ray microarray anode-structured target source," PNAS, doi.org10.1073/pnas.2103126118 (2021).
Zanette et al., "Two-Dimensional X-Ray Grating interferometer," Phys. Rev. Lett. vol. 105 (2010) pp. 248102-1 248102-4.
Zeeshan et al., "In-house setup for laboratory-based x-ray absorption fine structure spectroscopy measurements," Rev. Sci. Inst. 90, 073105 (2019).
Zeng et al., "Glass Monocapillary X-ray Optics and Their Applications in X-Ray Microscopy," X-ray Optics and Microanalysis: Proceedings of the 20th International Congress, AIP Conf. Proc. vol. 1221, (2010), pp. 41-47.
Zeng et al., "Restoration of X-ray phase-contrast imaging based on generative adversarial networks," Sci. Rep. doi.org/10/1030/s41598-024-77937-y (2024).
Zhan et al., "A Lightweight Method for Detecting IC Wire Bonding Defects in X-ray Images," Micromachines, vol. 14, p. 1119, https://doi.org/10.3390/mi14061119 (2023).
Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.
Zhang et al., "Measurement of the inner diameter of monocapillary with confocal X-ray scattering technology based on capillary X-ray optics," Appl. Opt. (Jan. 8, 2019), doc ID 351489, pp. 1-10.
Zhang et al., "Laboratory-scale X-ray absorption spectrometer with a cylindrical Johansson crystal analyzer," Nuclear Inst. and Methods in Physics Research, A (2023), doi: https://doi.org/10.1016/j.nima.2023.168067 (2023).
Zhang et al., "Hard X-ray projection imaging below 5 nm resolution," https://doi.org/10.21203/rs.3.rs-4093473/v1 (2024).
Zhang et al., "Fast and efficient hard X-ray projection imaging below 10 nm resolution," Op. Express, vol. 32, No. 17, pp. 30879-30897 (2024).
Zhang et al., "Virtual X-ray critical dimension metrology via Monte Carlo simulation," Op. Lett. vol. 49, No. 22, pp. 6569-6572 (2024).
Zhao et al., "X-ray wavefront sensing and optics metrology using a microfocus x-ray grating interferometer with electromagnetic phase stepping," Appl. Phys. Lett. 120, 181105 (2022).
Zhao et al., "Applications of the non-negative least-squares deconvolution method to analyze energy-dispersive x-ray fluorescence spectra," Appl. Op., Vo 62, No. 20, pp. 5556-5564 (2023).
Zhou et al., "X-ray wavefront characterization with grating interferometry using an x-ray microfocus laboratory source," Proceedings, vol. 11492, Advances in Metrology for X-Ray and EUV Optics IX; 114920Q, https://doi.org/10.1117/12.2576152 (2020).
Zhu et al., "Optical Wafer Defect Inspection at the 10 nm Technology Node and Beyond," 2022 Int. Extrem. Manuf. in press https://doi.org/10.1088/2631-7990/ac64d7 (2022).

* cited by examiner

SYSTEM AND METHOD FOR X-RAY ABSORPTION SPECTROSCOPY USING SPECTRAL INFORMATION FROM TWO ORTHOGONAL PLANES

CLAIM OF PRIORITY

This application claims the benefit of priority to U.S. Provisional Appl. No. 63/596,734 filed Nov. 7, 2023, which is incorporated in its entirety by reference herein.

BACKGROUND

Field

This application relates generally to an apparatus for x-ray absorption spectroscopy.

Description of the Related Art

X-ray absorption spectroscopy (XAS) is a widely used technique for determining the local geometric and/or electronic structure of matter. XAS provides a measurement of x-ray absorption of a sample as a function of x-ray energy over a range including the absorption edge of an element of interest. Widely used x-ray absorption spectroscopy (XAS) systems operating in transmission mode generally include: an x-ray emitting source, a crystal analyzer for monochromatizing x-rays and for providing energy resolution, and an x-ray detector for recording x-rays transmitted through the sample.

In XAS systems using a laboratory x-ray source (e.g., electron impact laboratory source), there are two design approaches that are widely used to compensate for the low brightness of these sources. The first approach uses a Rowland circle geometry together with a bent crystal (e.g., cylindrically bent Johann or Johansson crystal, spherically or toroidally bent Johann crystal) which can achieve a large x-ray collection angle in the tangential (e.g., focal, horizontal, polar, dispersion, meridian) plane of the crystal and in both the tangential and sagittal planes of the crystal (e.g., for spherically or toroidally bent Johann crystals) to utilize the large x-ray emission angles of a typical laboratory x-ray source. The tangential plane can be defined by the incident x-ray beam axis and the surface normal at the center of the crystal illuminated by the incident x-ray beam and the sagittal direction can be defined to be perpendicular to the tangential plane. The second approach uses von Hamos geometry with a crystal that is flat in the tangential plane and is cylindrically curved in the sagittal plane to collect and disperse x-rays over a finite spectral bandwidth in the tangential plane. The crystal has a reasonably large collection angle in the sagittal (e.g., azimuthal) direction, and the dispersed spectrum can be recorded by a position sensitive detector (e.g., a one-dimensional position sensitive detector).

SUMMARY

In certain implementations, an apparatus comprises an x-ray source configured to generate x-rays diverging in a first direction and diverging in a second direction substantially orthogonal to the first direction. The x-rays have a spectral intensity variation less than 10% over an energy bandwidth greater than 25 eV with at least one x-ray energy between 1 keV and 30 keV. At least some of the x-rays impinge a sample. The apparatus further comprises at least one diffractor configured to receive x-rays from the sample and to concurrently diffract at least some of the x-rays as a function of x-ray energy in the first direction and in the second direction. The apparatus further comprises at least one two-dimensional (2D) position-sensitive x-ray detector configured to receive at least some of the x-rays diffracted in the first direction by the at least one diffractor and at least some of the x-rays diffracted in the second direction by the at least one diffractor and to concurrently generate first spectral information of the x-rays diffracted in the first direction and second spectral information of the x-rays diffracted in the second direction. The apparatus further comprises an electromechanical subsystem configured to position the x-ray source, the at least one diffractor, and/or the at least one 2D position-sensitive x-ray detector relative to one another. The apparatus further comprises circuitry configured to receive the first and second spectral information from the at least one 2D position-sensitive x-ray detector and to generate a single x-ray absorption spectroscopy (XAS) spectrum using the first and second spectral information. The apparatus further comprises a sample holder configured to hold the sample between the x-ray source and the at least one diffractor or between the at least one diffractor and the at least one 2D position-sensitive x-ray detector.

In certain implementations, a method comprises providing a plurality of crystal diffractors distributed along at least one x-ray propagation axis of x-rays from a sample. At least one crystal diffractor of the plurality of crystal diffractors has an energy resolution better than 30 eV. The method further comprises irradiating the crystal diffractors using the x-rays such that each crystal diffractor of the plurality of crystal diffractors diffract a corresponding portion of the x-rays in a tangential direction and in a sagittal direction. The method further comprises concurrently measuring the diffracted portions of the x-rays from the plurality of crystal diffractors in the tangential direction and in the sagittal direction and generating an x-ray absorption spectrum of the sample using the measured diffracted portions of the x-rays in the tangential direction and in the sagittal direction.

DETAILED DESCRIPTION

Both the Rowland circle geometry approach and the von Hamos geometry approach are constrained by the spectral resolution being used (e.g., less than 2 eV for x-ray absorption near edge spectroscopy (XANES)) in a direction parallel to the tangential plane and result in inefficient use of source x-rays and concomitant low measurement throughput. Both the Rowland circle geometry and the von Hamos geometry impose stringent constraints on the x-ray source size and shape, the quality of the crystal and its surface figure, and the positional and angular alignment between the x-ray source, the crystal, and the detector (e.g., often with a slit aperture with Rowland circle geometry). These constraints can result in a large overall system size and a high cost of the XAS system. Furthermore, XAS measurements operating in fluorescence detection mode do not work in the Von Hamos geometry and are highly problematic with Rowland circle geometry with a point detector. In addition, the azimuthal angle can be limited by the energy resolution used for the XAS measurements, especially for XANES, and relatively large x-ray beam size in the sagittal direction on a sample with a cylindrically bent crystal relative to an energy resolving detector (e.g., silicon drift detector).

Figure 1:
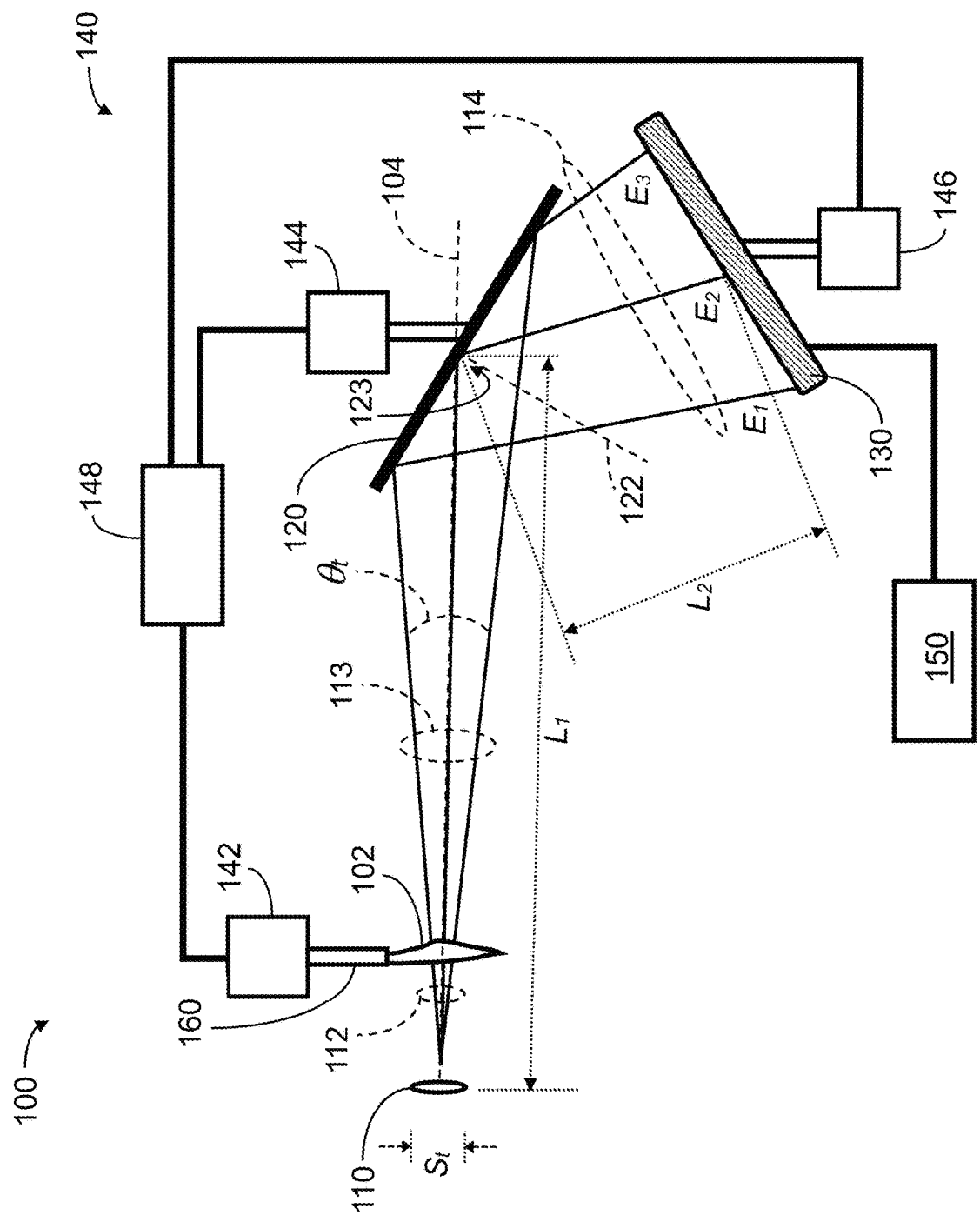
FIG. 1 schematically illustrates a cross-sectional view of an example apparatus 100 for performing x-ray absorption spectroscopy (XAS) in accordance with certain implementations described herein.

FIG. 1 schematically illustrates a cross-sectional view of an example apparatus 100 for performing x-ray absorption spectroscopy (XAS) in accordance with certain implementations described herein. The apparatus 100 comprises an x-ray source 110 configured to generate x-rays 112 diverging in a first direction and diverging in a second direction substantially orthogonal to the first direction, the x-rays 112 having a spectral intensity variation less than 10% (e.g., less than 5%; less than 1%) over an energy bandwidth greater than 25 eV (e.g., greater than 100 eV; greater than 500 eV) with at least one x-ray energy between 1 keV and 30 keV. At least some of the x-rays 112 impinge a sample 102. The apparatus 100 further comprises at least one diffractor 120 configured to receive x-rays 113 from the sample 102 and to concurrently angularly disperse (e.g., diffract according to Bragg's law) at least some of the x-rays 114 as a function of x-ray energy in the first direction (e.g., parallel to a tangential plane) and in the second direction (e.g., parallel to a sagittal or azimuthal plane). The apparatus 100 further comprises a two-dimensional (2D) position-sensitive x-ray detector 130 configured to receive at least some of the x-rays 114 diffracted in the first direction by the at least one diffractor 120 and at least some of the x-rays 114 diffracted in the second direction by the at least one diffractor 120 and to concurrently generate first spectral information of the x-rays 114 diffracted in the first direction and second spectral information of the x-rays 114 diffracted in the second direction.

The apparatus 100 further comprises an electromechanical subsystem 140 configured to position the x-ray source 110, the at least one diffractor 120, and the at least one 2D position-sensitive x-ray detector 130 relative to one another. For example, the at least one 2D position-sensitive x-ray detector 130 can be positioned such that the at least one 2D position-sensitive x-ray detector 130 concurrently generates the first spectral information with a first predetermined energy resolution (e.g., less than 20 eV; less than 5 eV; less than 2 eV) over a first energy bandwidth (e.g., greater than 25 eV; greater than 100 eV; greater than 500 eV) and generates the second spectral information with a second predetermined energy resolution (e.g., less than 5 eV; less than 2 eV; less than 1 eV) over a second energy bandwidth (e.g., greater than 10 eV; greater than 30 eV) in the second direction. The apparatus 100 further comprises circuitry 150 configured to receive the first and second spectral information from the at least one 2D position-sensitive x-ray detector 130 and to generate a single XAS spectrum using the first and second spectral information. The apparatus 100 further comprises a sample holder 160 configured to hold the sample 102 between the x-ray source 110 and the at least one diffractor 120 (e.g., to position the sample 102 to be irradiated by the x-rays 112 originating from the x-ray source 110).

As used herein, the tangential plane is defined as the plane comprising an incident x-ray beam axis 104 and the surface normal 122 of the at least one diffractor 120 at a center 123 of the x-rays 113 incident on the at least one diffractor 120. The sagittal plane (e.g., azimuthal plane) is defined as the plane that comprises the x-ray beam axis 104 and is perpendicular to the tangential plane. While FIG. 1 only shows a cross-sectional view of the apparatus 100 in the tangential plane (e.g., the x-rays 112 impinging the sample 102, the x-rays 113 from the sample 102, and the angularly dispersed x-rays 114 in the tangential plane), the cross-sectional view of the apparatus 100 in the substantially orthogonal sagittal plane has a similar appearance.

In certain implementations, the x-ray source 110 (e.g., a primary source) comprises an electron impact x-ray source that comprises an electron column configured to produce a focused electron beam and to direct the focused electron beam to impinge at least one x-ray target (e.g., anticathode) to produce the x-rays 112. For example, the at least one x-ray target can comprise at least a first x-ray target consisting essentially of a first atomic element (e.g., molybdenum; copper; rhodium) and a second x-ray target consisting essentially of a second atomic element (e.g., tungsten; silicon). The first and second atomic elements can have x-ray absorption edge energies that differ by more than 1 keV from one another, and the first and second x-ray targets can be spatially separated from one another. In certain implementations, the x-ray source 110 (e.g., a secondary source) comprises an x-ray focusing optic, examples of which include, but are not limited to: a capillary mirror optic; a KB mirror optic, the x-ray focusing optic configured to collect and focus x-rays from an electron impact x-ray source. In certain implementations, a portion of the x-ray spectrum of the x-rays 112 can be substantially free of sharp spectral features (e.g., Bremsstrahlung radiation that is free of characteristic emission lines of one or more elements in the electron impact x-ray source).

In certain implementations, the x-ray source 110 can have an x-ray source spot (e.g., a spot from which the x-rays 112 are emitted) with an x-ray source spot size in the tangential direction $S_t$ that is less than 200 microns (e.g., less than 100 microns; less than 50 microns; less than 30 microns; less than 15 microns; less than 5 microns). In certain implementations, the x-ray source spot has an x-ray source spot size in the sagittal direction $S_s$ that is substantially equal to or larger than the x-ray source spot size in the tangential direction $S_t$ and is less than 5 millimeters (e.g., less than 4 millimeters; less than 3 millimeters; less than 2 millimeters; less than 1 millimeter; less than 0.5 millimeter; less than 0.3 millimeter; less than 0.1 millimeter).

In certain implementations (see, e.g., FIG. 1), the x-rays 113 received by the at least one diffractor 120 comprise a portion of the x-rays 112 that are transmitted through the sample 102 (e.g., the apparatus 100 operated in transmission mode for XAS), and the divergence angle of the x-rays 113 received by the at least one diffractor 120 can be substantially equal to or less than the divergence angle of the x-rays 112 impinging the sample 102. In certain other implementations, the x-rays 113 received by the at least one diffractor 120 comprise a portion of the fluorescence x-rays that are generated on or within the sample 102 by the x-rays 112 absorbed by the sample 102 while the x-rays 112 are configured to not be received by the at least one diffractor 120 (e.g., the apparatus 100 operated in x-ray emission spectroscopy mode), and the divergence angle of the x-rays 113 received by the at least one diffractor 120 can be larger than the divergence angle of the x-rays 112 impinging the sample 102. In certain implementations, (see, e.g., FIG. 1), the sample 102 is positioned between the x-ray source 110 and the at least one diffractor 120, while in certain other implementations, the sample 102 is positioned between the at least one diffractor 120 and the at least one 2D position-sensitive x-ray detector 130 (e.g., to position the sample 102 in the diffracted x-rays 114 from the at least one diffractor 120).

In certain implementations, the at least one diffractor 120 is configured to concurrently angularly disperse x-rays 114 of the received portion of the x-rays 113 in at least two substantially orthogonal directions. For example, the at least one diffractor 120 can comprise a crystal that diffracts the spectrum of x-rays 113 transmitted through the sample 102 according to Bragg's law: $2*d*\sin(\theta)=n*\lambda$, where d is the lattice spacing of the crystal, $\theta$ is the Bragg angle (e.g., the angle between the incident x-rays 112 and the lattice planes of the crystal), n is an integer, and $\lambda$ is the wavelength of x-rays that satisfies Bragg's law for the values of d and $\theta$. In certain implementations, the at least one diffractor 120 comprises a plurality of crystals (e.g., crystals arranged along the x-ray beam axis 104 such that the x-rays 113 impinge the crystals sequentially). In certain other implementations, the at least one diffractor 120 comprises a plurality of mosaic crystals (e.g., HOPG; HAPG). In certain other implementations, the at least one diffractor 120 comprises a single crystal comprising at least one material selected from the group consisting of: diamond; graphite; quartz; LiF; silicon; germanium. In certain implementations, at least one upstream crystal of the plurality of crystals has an x-ray transmission greater than 10% (e.g., greater than 20%; greater than 40%; greater than 60%) of x-rays having energies greater than 3 keV (e.g., greater than 10 keV; greater than 20 keV).

Figure 2:
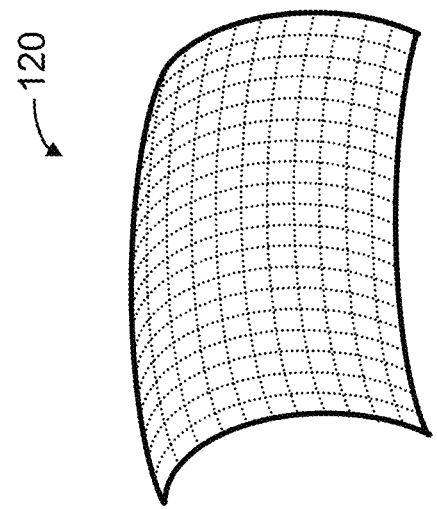
FIG. 2 schematically illustrates a cylindrically curved crystal (left) of a diffractor that is flat in one direction and cylindrically curved in the orthogonal direction, and a toroidally curved crystal (right) of a diffractor that is curved in two orthogonal directions in accordance with certain implementations described herein.
Figure 2:
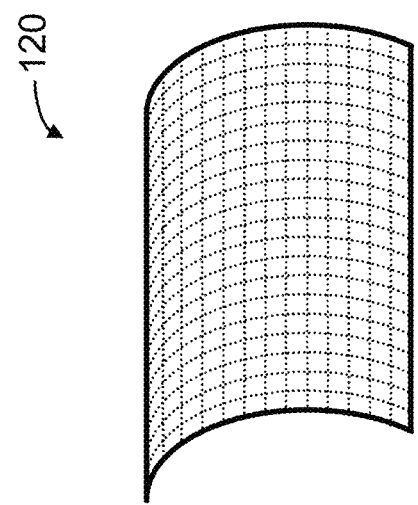

In certain implementations, the at least one diffractor 120 comprises at least one substantially flat (e.g., planar; radius of curvature greater than 100 meters) crystal, while in certain other implementations, the at least one diffractor 120 is curved (e.g., bent) in at least one of the first direction and the second direction (e.g., having a radius of curvature in one or both of the first and second directions in the range of 5 centimeters to 500 centimeters). Examples of substantially flat crystals include but are not limited to: Si crystals (e.g., Si(111), Si(311), Si(220), Si(400), Si(331)), Ge crystals (e.g., Ge(111), Ge(311), Ge(220), Ge(400), Ge(331), Ge crystals with higher Miller index diffraction planes), LiF crystals (e.g., LiF(111), LiF(200), LiF(222), LiF(400)), diamond crystals, HAPG/HOPG crystals, or other crystals. Examples of curved diffractors 120 include but are not limited to: cylindrically bent Johann crystal; cylindrically bent Johansson crystal; spherically bent Johann crystal; toroidally bent crystal. FIG. 2 schematically illustrates a cylindrically curved crystal (left) of a diffractor 120 that is flat in one direction and cylindrically curved in the orthogonal direction, and a toroidally curved crystal (right) of a diffractor 120 that is curved in two orthogonal directions in accordance with certain implementations described herein. Other curved crystals compatible with certain implementations described herein include but are not limited to: elliptically curved crystals, spherically curved crystals. The curved diffractor 120 can be configured to increase an acceptance angle of the x-rays 113 received from the sample 102 (e.g., in the tangential plane).

In certain implementations, the at least one diffractor 120 is configured to receive the x-rays 113 from the sample 102 having a divergence angle $\theta_t$ over the first direction (e.g., tangential direction) greater than or equal to 3 mrad (e.g., greater than 10 mrad; greater than 20 mrad; greater than 30 mrad; greater than 50 mrad; greater than 100 mrad) and/or a divergence angle $\theta_s$ over the second direction (e.g., sagittal direction) greater than or equal to 5 mrad (e.g., greater than 10 mrad; greater than 20 mrad; greater than 50 mrad; greater than 100 mrad). In certain implementations, the at least one diffractor 120 comprises an asymmetrically cut crystal having an asymmetric cut angle greater than 4 degrees (e.g., greater than 10 degrees; greater than 20 degrees; greater than 30 degrees) in the tangential plane.

In certain implementations, the at least one 2D position-sensitive x-ray detector 130 (e.g., energy dispersive detector) is configured to simultaneously (e.g., concurrently) record at least a portion of the angularly dispersed x-rays 114 that are diffracted by the at least one diffractor 120 in the two substantially orthogonal directions. For example, the at least one 2D position-sensitive x-ray detector 130 can comprise a direct conversion x-ray detector (e.g., CCD detector; CMOS detector; pixel array photon counting detector) or an indirect conversion x-ray cameras (e.g., comprising an x-ray to visible light conversion component and a visible light camera). In certain implementations, the at least one 2D position-sensitive x-ray detector 130 has a pixel size in a range of 2 microns to 100 microns in the first direction and in a range of 2 microns to 2 millimeters in the second direction. In certain implementations, the at least one 2D position-sensitive x-ray detector 130 has a pixel array number greater than 10 (e.g., greater than 50; greater than 200; greater than 500) in the first direction and/or greater than 2 (e.g., greater than 10; greater than 50; greater than 200) in the second direction.

In certain implementations, the electromechanical subsystem 140 comprises at least one motorized sample stage 142 mechanically coupled to the sample 102 (e.g., via the sample holder 160) and configured to controllably move (e.g., adjust; translate; rotate) the sample 102, at least one motorized diffractor stage 144 mechanically coupled to the at least one diffractor 120 and configured to controllably move (e.g., adjust; translate; rotate) the at least one diffractor 120, and at least one motorized detector stage 146 mechanically coupled to the at least one 2D position-sensitive x-ray detector 130 and configured to controllably move (e.g., adjust; translate; rotate) the at least one 2D position-sensitive x-ray detector 130. Each of the at least one motorized sample stage 142, at least one motorized diffractor stage 144, and the at least one motorized detector stage 146 can comprise one or more linear motion stages and/or one or more rotational motion stages. Each of the at least one motorized sample stage 142, the at least one motorized diffractor stage 144, and the at least one motorized detector stage 146 can be responsive to control signals from control circuitry 148 (e.g., processor) of the electromechanical subsystem 140. The control circuitry 148 can be configured to respond to user input to adjust the relative positions of the various stages 142, 144, 146 or the control circuitry 148 can be configured to adjust the relative positions of the various stages 142, 144, 146 without user input. The electromechanical subsystem 140 can be configured to controllably position the at least one diffractor 120 and to change Bragg angles of the at least one diffractor 120.

In certain implementations, the circuitry 150 comprises spectral processing circuitry configured to determine a spectral change of the x-rays 113 due to their interaction with the sample 102. The circuitry 150 can comprise at least one processor, examples of which include but are not limited to: microelectronic circuitry; one or more microprocessors, digital signal processors ("DSP"), and application-specific integrated circuits (ASICs). The circuitry 150 can further comprise at least one storage device (e.g., non-volatile memory; flash memory) operatively coupled to the at least one processor. While the control circuitry 148 and the circuitry 150 are described herein as being separate components, in certain implementations, the control circuitry 148 and the circuitry 150 can be integrated with one another (e.g., can comprise the same at least one processor and/or the same at least one storage device).

In certain implementations, the sample 102 can comprise a pellet, a thin film, or a powder, and can have a thickness along the x-ray beam axis 104 such that the transmission of the x-rays 112 through the sample 102 (e.g., the portion of the x-rays 112 that are transmitted through the sample 102 to be the x-rays 113) is in a range of 2% to 90% (e.g., a range of 10% to 70%; a range of 10% to 50%; a range of 10% to 20%) and can be optimized to provide a predetermined throughput. The sample 102 can have a concentration of an analyte of interest in a range of 1% to 100% (e.g., in a range of 5% to 50%).

In certain implementations, the sample holder 160 comprises a substrate upon which the sample 102 is mounted or deposited. For example, the substrate can be configured to hold the sample 102 on the x-ray beam axis 104 between the x-ray source 110 and the at least one diffractor 120 and the substrate can have a non-zero transmittance of the x-rays 112 (e.g., the substrate can have a thickness less than 50 microns, less than 500 microns, or less than 1 millimeter along the x-ray beam axis 104). For another example, the substrate can be configured to hold the sample 102 between the at least one diffractor 120 and the at least one 2D position-sensitive x-ray detector 130 and the substrate can have a non-zero transmittance of the x-rays 114 (e.g., the substrate can have a thickness less than 50 microns, less than 500 microns, or less than 1 millimeter along a direction from the at least one diffractor 120 to the at least one 2D position-sensitive x-ray detector 130).

Certain implementations described herein are configured to concurrently measure x-rays diffracted (e.g., energy dispersed) in the tangential and sagittal directions and to use the x-rays diffracted in the sagittal direction to obtain high energy resolution while relaxing the energy resolution in the tangential direction. Certain such implementations can increase efficient use of the x-rays 112 from the x-ray source 110 (e.g., improving throughput) with small sample sizes (e.g., less than 50 millimeters; less than 20 millimeters; less than 3 millimeters) with the sample 102 positioned close to the x-ray source 110 within a distance less than 100 millimeters (e.g., less than 50 millimeters; less than 30 millimeters; less than 5 millimeters), and/or can reduce the distance between the x-ray source 110 and the at least one crystal of the at least one diffractor 120 to be less than 400 millimeters (e.g., less than 200 millimeters; less than 100 millimeters). Certain other such implementations can combine the high energy resolution spectrum in the sagittal direction (e.g., less than 5 eV; less than 2 eV; less than 1 eV) with the spectrum in the tangential direction to produce an XAS spectrum with large energy bandwidth (e.g., greater than 25 eV; greater than 100 eV; greater than 500 eV) and high energy resolution (e.g., less than 5 eV; less than 2 eV; less than 1 eV).

Figure 3:
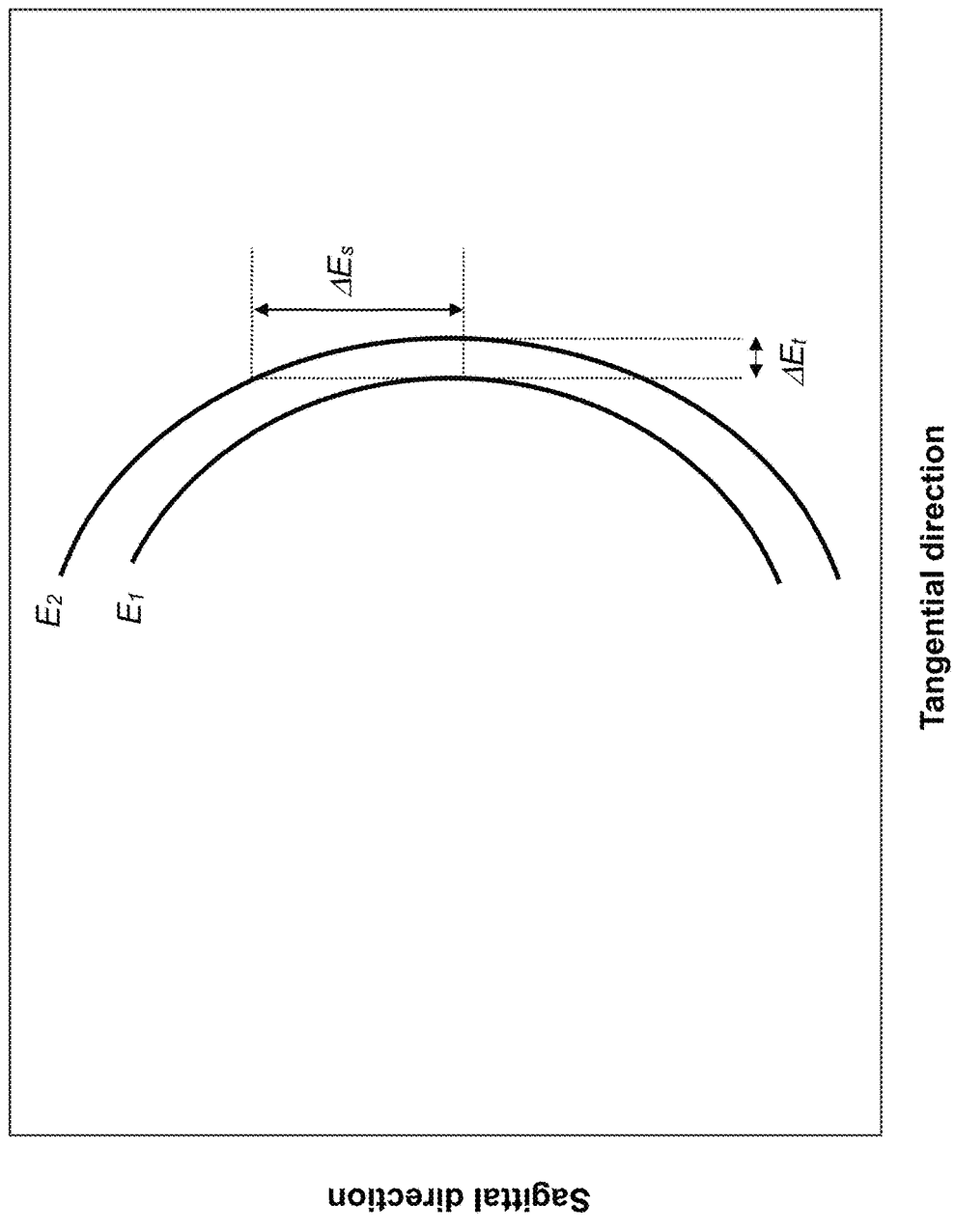
FIG. 3 schematically illustrates diffraction locus points of the x-rays having two different x-ray energies $E_1$, $E_2$ and diffracted by a substantially flat crystal in accordance with certain implementations described herein.

FIG. 3 schematically illustrates diffraction locus points of the x-rays 113 having two different x-ray energies $E_1$, $E_2$ and diffracted by a substantially flat crystal (e.g., the transmitted portion of the x-rays 112 from a small x-ray source spot) in accordance with certain implementations described herein. Note that the spatial separation in the sagittal direction $\Delta E_s$ between the two arcs for the two x-ray energies is significantly larger than the spatial separation in the tangential direction $\Delta E_t$ (e.g., parallel to the tangential plane), showing that the energy dispersion versus angle in the sagittal direction is much weaker than the energy dispersion versus angle in the tangential direction, such that the gradient of x-ray energy change in the tangential direction is substantially larger than the gradient of x-ray energy change in the sagittal direction. Therefore, measuring the energy dispersion in the sagittal direction can provide much higher energy resolution than measuring energy dispersion in the tangential direction (e.g., using the at least one 2D position-sensitive x-ray detector 130 to record the x-rays 114 diffracted by the crystal of the at least one diffractor 120 in both the sagittal and tangential directions). For a given angular range of the x-rays 113 incident on the flat crystal, the x-ray energy bandwidth diffracted in the tangential direction can be substantially larger than the x-ray energy bandwidth diffracted in the sagittal direction. By measuring and analyzing the x-rays 114 diffracted in the two directions (e.g., using the at least one 2D position-sensitive x-ray detector 130 and circuitry 150), the apparatus 100 can obtain spectra with a high energy resolution over a wide energy bandwidth. While the diffraction locus points of FIG. 3 and the discussion herein are for a substantially flat crystal, this analysis is also applicable for curved crystals (e.g., cylindrically curved Johann/Johansson crystals; toroidal crystals; spherically curved crystals).

In the sagittal plane, the x-ray energy diffracted at an angle ω can be approximately given by $E_0 = E \cdot \cos \omega$, where $E_0$ is the x-ray energy diffracted at ω=0 and at Bragg angle θ. The change ΔE" in the x-ray energy due to a small change of Δω can be expressed as:

$$\Delta E'' = E \cdot \Delta\omega \cdot \sin\omega \quad (1)$$

Therefore, except for Bragg angle θ close to 90 degrees, energy dispersion in the direction parallel to the tangential plane can be substantially larger (e.g., higher) than the energy dispersion in the sagittal direction for the same x-ray source angular size $S_{at}$ in the tangential direction and in the sagittal direction $S_{as}$, respectively (e.g., provided that Bragg angles is near 90 degrees, where $S_{as}=S_s/L_1$ and $S_{at}=S_t/L_1$, and $S_s$ and $S_t$ are the x-ray source spot size parallel to the sagittal plane and parallel to the tangential plane, respectively, and $L_1$ is the distance between the x-ray source 110 and the crystal of the at least one diffractor 120). Certain implementations described herein utilize this relationship to obtain a high x-ray energy resolution using diffracted x-rays parallel to the sagittal plane while obtaining a larger energy bandwidth in the direction parallel to the tangential plane.

In certain implementations, to generate an XAS spectrum using concurrent measurements in the first and second directions, the apparatus 100 is configured with $\Delta E''/E$ less than $3\times10^{-4}$ (e.g., less than $10^{-4}$) and $\Delta E'/E>2\cdot\Delta E''/E$ (e.g., greater than $5\cdot\Delta E''/E$). In certain implementations, the crystal of the at least one diffractor 120 and the at least one 2D position-sensitive x-ray detector 130 are configured to detect and record measurement x-ray energy bandwidths greater than 2× (e.g., greater than 4×; greater than 10×) of $\Delta E''/E$ in the sagittal direction and greater than 2× (e.g., greater than 5×; greater than 20×; greater than 100×) of $\Delta E'/E$ in the tangential direction. Certain implementations that obtain these bandwidths and resolutions have the following attributes:

1. $S_s/L_1 \leq (\Delta E/E)\cdot\cot\omega$ and $S_{at}=S_t/L_1 \leq (\Delta E'/E)/\cot\theta$.
2. The size of the crystal of at least one diffractor 120 is sufficiently large to accept the x-rays 113 over angles containing the measurement energy bandwidths in both the tangential and sagittal directions.
3. The at least one 2D position-sensitive x-ray detector 130 has more pixels than the measurement energy bandwidth divided by the energy resolution in the respective tangential and sagittal directions.

In certain implementations (e.g., for the practical reason of keeping the overall system size to less than 2 meters and/or for availability of crystals and 2D position-sensitive x-ray detectors), $L_1$ can be less than 1.5 meters (e.g., as small as 10 millimeters for an x-ray source spot size $S_t$ in the tangential direction of about 1 micron). The x-ray source spot size $S_t$ in the tangential direction can be less than 100 microns and the x-ray source spot size $S_s$ in the sagittal direction can be substantially larger than $S_t$ (e.g., greater than 2×; greater than 5×; greater than 20×; greater than 50×). The length of the reflecting surface of the crystal of the at least one diffractor 120 in the tangential plane and/or sagittal plane can range from 1 millimeter to 200 millimeters, depending on L; and on the measurement energy bandwidths in the tangential and sagittal directions.

In certain implementations, the x-ray energy resolution in the tangential plane is larger than the measurement energy resolution (e.g., $E/\Delta E < 10^4$ for XANES; $E/\Delta E < 4\times10^4$ for EXAFS), which can facilitate using smaller $L_1$ distances, larger x-ray source spot sizes in the tangential plane, operating crystals of the at least one diffractor 120 at low Bragg angles with lower Miller diffraction indices, and/or asymmetrically cut crystals. In certain implementations, the energy resolution in the tangential plane is larger than 2 eV (e.g., larger than 5 eV; larger than 10 eV; larger than 20 eV).

To concurrently measure an x-ray spectrum over a large energy bandwidth (e.g., greater than or equal to 25 eV; greater than or equal to 30 eV; greater than or equal to 200 eV; greater than or equal to 800 eV) with a predetermined energy resolution (e.g., $\Delta E/E < 10^{-4}$ for XANES and $\Delta E/E < 4\times10^{-4}$ for EXAFS), the x-ray source 110 and the at least one 2D position-sensitive x-ray detector 130 can be located off the Rowland circle for curved crystals (e.g., cylindrically bent Johann crystal or spherically bent Johann crystals). For curved crystal with a smallest value of the radius curvature $R_t$ in the tangential plane, $L_1$ and $L_2$ can satisfy at least one of the following conditions:

$$L_1 < 2*R_t*\sin(\theta);$$
$$L_2 < 2*R_t*\sin(\theta); \text{ and}$$
$$1/L_1 + 1/L_2 < 2/(R_t*\sin(\theta)).$$

For curved crystals with small curvature $R_s$ in the sagittal direction, $L_1$ and $L_2$ can satisfy the following condition: $1/L_1+1/L_2<2*\sin(\theta)/R_s$, which differs from the conventional Rowland circle geometry. Certain implementations utilize cylindrically curved Johann/Johansson crystals, spherically curved Johann crystals, and toroidally curved crystals, while certain other implementations utilize curved crystals with a general shape that satisfies the two conditions: $L_1<2*R_t*\sin(\theta)$ and $L_2<2*R*\sin(\theta)$. The energy bandwidth centered to an energy E concurrently measured with a cylindrically curved Johann/Johansson crystal with a radius $R_t$ and an x-ray source 110 placed inside the Rowland circle with a distance of $L_3$ (e.g., distance from the x-ray source 110 to the crystal) can be approximately given by $E*L_3/(2*R*\sin(\theta_r))$ where $\theta_r$ is the divergence angle of the x-rays received by the at least one diffractor 120 in the tangential direction. Certain such implementations can provide increased throughput for measuring XAS spectra as compared to flat crystals because more x-rays 112 can be used due to the larger $\theta_r$.

For example, the apparatus 100 can be configured to measure an XANES spectrum near the Cu K-absorption edge in a sample 102 comprising a Cu-containing compound. The XANES spectrum can have an energy resolution better than 1 eV and an energy bandwidth over 200 eV (e.g., from 8900 eV to 9100 eV) using the following parameters:

1. The x-ray source spot size in the tangential and sagittal directions can be 30 microns and 1 millimeter, respectively;
2. The source-to-crystal distance $L_1$ can be 100 millimeters;
3. The crystal can be a flat Ge(111) crystal with a width in the tangential direction greater than 10 millimeters and a width in the sagittal direction greater than 40 millimeters;
4. The at least one 2D position-sensitive x-ray detector 130 can comprise a direct detection CCD/CMOS detector with a pixel size of 13.5 microns and a pixel array of 500×500.

Using these parameters (e.g., with an x-ray beam that is quasi-parallel in the tangential plane), the apparatus 100 can achieve $\Delta E'=12.3$ eV (e.g., $8900*\cot(12.3°)*30$ μm/100 mm) and $\Delta E''=0.89$ eV (e.g., $8900*(1/100)^2$). If the x-rays 113 are diverging in the tangential plane, there will be little to no improvement in the energy resolution in the direction parallel to the sagittal plane. The energy resolution in the tangential plane can be determined by either the x-ray source spot size or the pixel size, whichever is smaller, so the total energy resolution can be a convolution of the energy resolutions determined by both the vertical divergence and the horizontal divergence.

In certain implementations in which the at least one diffractor 120 comprises a crystal size larger than 13 millimeters in the sagittal direction, the at least one diffractor 120 can accept more than 130 mrad of the x-rays 113 and can disperse the x-rays 114 over an energy bandwidth of 13 eV with an energy resolution of 0.89 eV in the sagittal direction.

The crystal size in the tangential plane can be configured to accept x-rays 113 within an energy bandwidth of 200 eV, corresponding to a Bragg angle change of 4 mrad. For example, with a Bragg angle of 12.3°, the crystal size in the tangential plane can be greater than 19 millimeters (e.g., 100 mm*0.004/sin(12.3°)). A 2D position-sensitive x-ray detector 130 with pixel sizes less than 0.3 mrad (e.g., 30 μm/100 mm*($L_1+L_2$)) and 10 mrad (e.g., 1 mm/100 mm*($L_1+L_2$)) in the tangential and sagittal directions, respectively, can be used, where $L_2$ is the distance from the crystal of the at least one diffractor 120 to the at least one 2D position-sensitive x-ray detector 130.

For another example, the apparatus 100 can be configured to measure the EXAFS spectrum near the Cu K-absorption edge in a sample 102 comprising a Cu-containing compound to achieve an energy resolution better than 4 eV and an energy bandwidth over 800 eV (e.g., from 8900 eV to 9700 eV). In certain implementations, the apparatus 100 can be configured for XAS measurements with x-ray energies between 1.5 keV to 30 keV, covering almost all the elements with atomic numbers greater than 12 (e.g., Mg).

In certain implementations, the at least one diffractor 120 comprises one or more asymmetric cut crystals to broaden the energy resolution as compared to a symmetrically cut crystal. In certain implementations configured to achieve a predetermined ΔE, the contribution of the intrinsic crystal energy resolution $E_e$ and the energy resolution ΔE' due to the angular extend of the x-ray source 110 can be configured to be comparable or equal to one another. In certain other implementations, increasing $E_c$ can be achieved using asymmetric cut crystals, which can make efficient use of x-rays 112 propagating along the x-ray beam axis 104 from the x-ray source 110 and incident on a crystal of the at least one diffractor 120.

Figure 4:
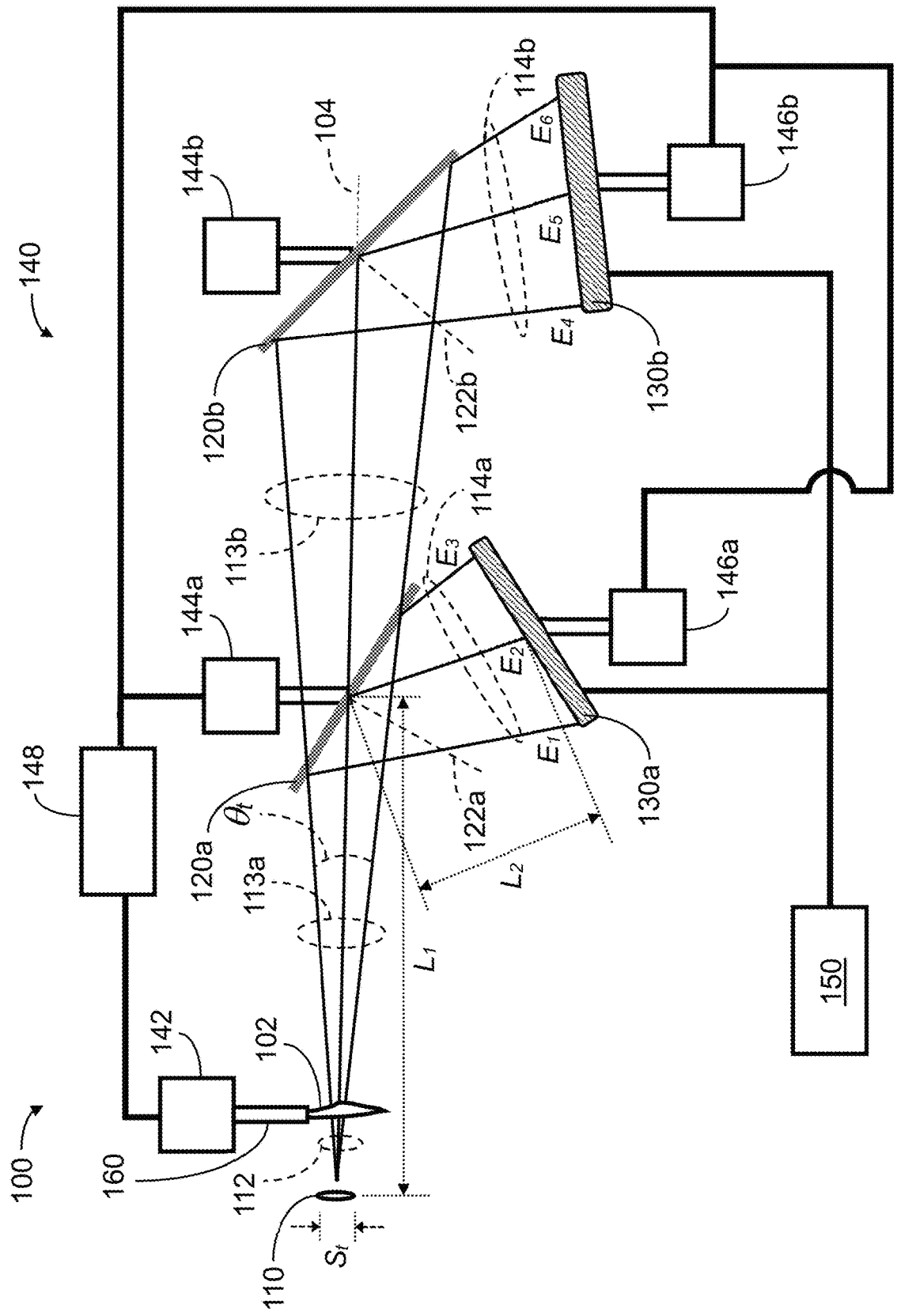
FIG. 4 schematically illustrates a cross-sectional view of an example apparatus comprising a plurality of diffractors distributed longitudinally along the incident x-ray beam axis and a plurality of 2D position-sensitive x-ray detectors in accordance with certain implementations described herein.
Figure 5:
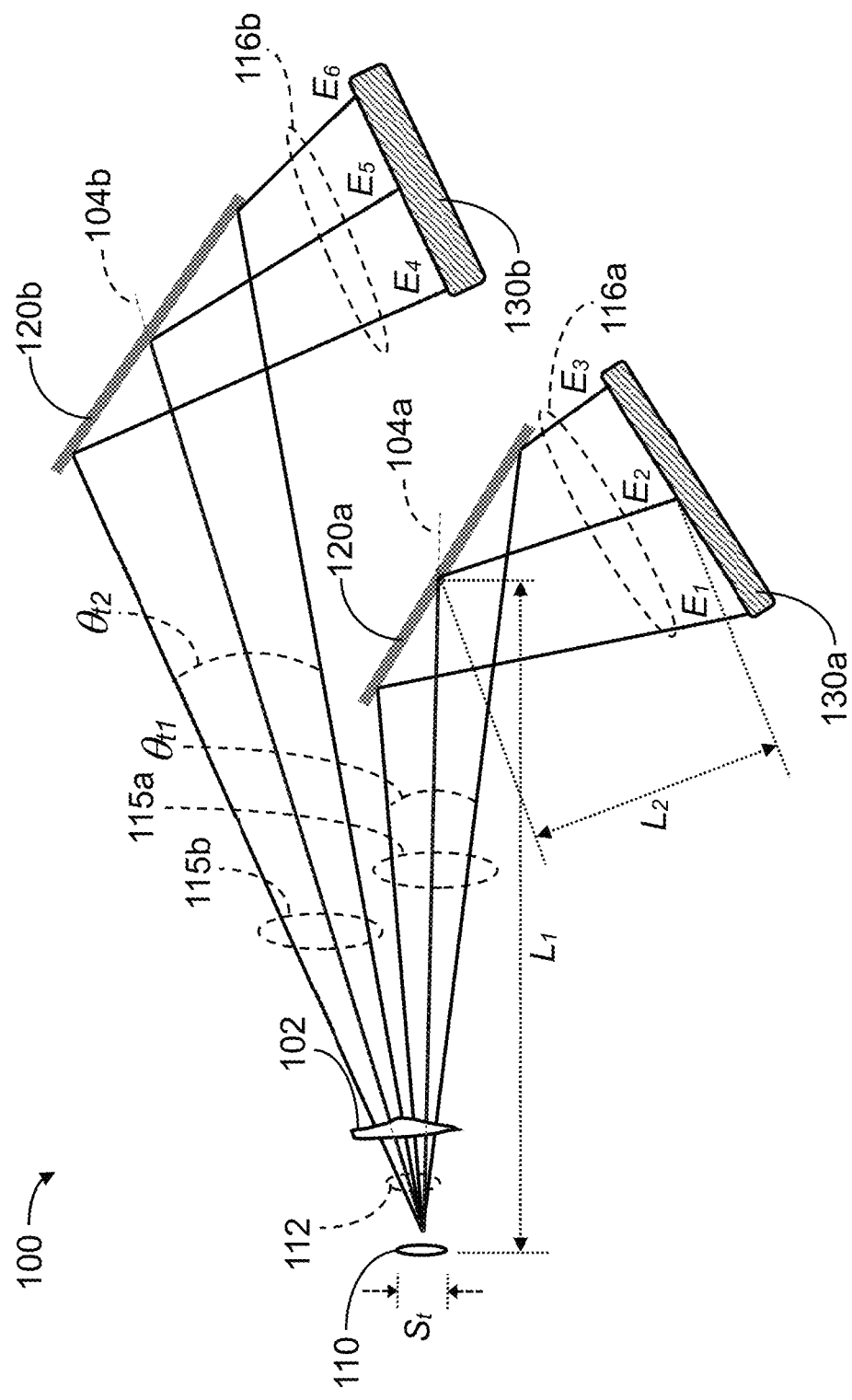
FIG. 5 schematically illustrates an example of x-ray absorption spectroscopy apparatus comprising a plurality of laterally distributed x-ray diffractors and a plurality of position sensitive x-ray detectors in accordance with certain implementations described herein.

In certain implementations, the at least one diffractor 120 comprises a plurality of diffractors 120 and the at least one 2D position-sensitive x-ray detector 130 comprises a plurality of 2D position-sensitive x-ray detectors 130. For example, FIG. 4 schematically illustrates a cross-sectional view of an example apparatus 100 (e.g., configured for XAS measurements) comprising a plurality of diffractors 120 (e.g., first and second diffractors 120a,b) distributed longitudinally along the x-ray beam axis 104 and a plurality of 2D position-sensitive x-ray detectors 130 (e.g., first and second 2D position-sensitive x-ray detectors 130a,b) in accordance with certain implementations described herein. FIGS. 4 and 5 show the cross-sectional view in only the tangential plane, but the cross-sectional view in the sagittal plane has a similar appearance. The apparatus 100 can comprise an electromechanical subsystem 140 (e.g., shown in FIG. 4 but not shown in FIG. 5) comprising a first motorized diffractor stage 144a in mechanical communication with a first diffractor 120a, a second motorized diffractor stage 144b in mechanical communication with a second diffractor 120b, a first motorized detector stage 146a in mechanical communication with a first 2D position-sensitive x-ray detector 130a, and a second motorized detector stage 146b in mechanical communication with a second 2D position-sensitive x-ray detector 130b. The electromechanical subsystem 140 can be configured to position the x-ray source 110, the first and second diffractors 120a,b, and the first and second 2D position-sensitive x-ray detectors 130a,b relative to one another (e.g., to record x-ray spectra with a predetermined energy resolution in the sagittal direction over an energy bandwidth in the sagittal plane and a predetermined energy resolution over an energy bandwidth in the tangential plane). The apparatus 100 can comprise circuitry 150 (e.g., shown in FIG. 4 but not shown in FIG. 5) configured to receive spectral information from the first and second 2D position-sensitive x-ray detector 130a,b and to generate XAS spectra using the received spectral information. While each of FIGS. 4 and 5 shows only two diffractors 120a,b with two corresponding 2D position-sensitive x-ray detectors 130a,b, certain other implementations use more than two diffractors 120 and/or more than two corresponding 2D position-sensitive x-ray detectors 130. While FIGS. 4 and 5 schematically illustrate diffractors 120a,b comprising flat crystals, certain other implementations use curved crystals or a mixture of flat and curved crystals. Depending on the measurements to be made, the crystals can be flat, curved, symmetric cut, asymmetric cut, and/or comprising different materials.

As shown in FIG. 4, at least some of the x-rays 113a from (e.g., transmitted through) the sample 102 impinge the first diffractor 120a which angularly disperses (e.g., diffracts) x-rays 114a with energies in a range of $E_1$ to $E_3$ to the first 2D position-sensitive x-ray detector 130a. At least some of the x-rays 113b transmitted through the first diffractor 120a impinge the second diffractor 120b which angularly disperses (e.g., diffracts) x-rays 114b with energies in a range of $E_4$ to $E_6$ to the second 2D position-sensitive x-ray detector 130b.

In certain implementations, the first diffractor 120a can have an x-ray transmission greater than or equal to 2% (e.g., at least 2% of the x-rays 113a that are transmitted through the sample 102 and impinge the first diffractor 120a are transmitted through the first diffractor 120a). In certain other implementations with more than two diffractors 120, the upstream diffractors 120 can have an x-ray transmission greater than or equal to 2% (e.g., greater or equal to 10% for x-rays of energies greater than 3 keV) and at least some of the x-rays 113 transmitted through the upstream diffractors can propagate to be incident on the downstream diffractors.

In certain implementations, the diffractors 120 are configured such that the energies of the x-rays 113 diffracted in the tangential direction by the sequentially impinged diffractors 120 (e.g., distributed along the x-ray beam axis 104) can differ by at least 0.5 eV (e.g., at least 1 eV; at least 5 eV; at least 50 eV; at least 100 eV). For example, the energy $E_1$ of x-rays 113a diffracted by the first diffractor 120a and the energy $E_4$ of x-rays 113b diffracted by the second diffractor 120b can differ by at least 0.5 eV. Similarly, the energy $E_2$ of x-rays 113a diffracted by the first diffractor 120a and the energy $E_5$ of x-rays 113b diffracted by the second diffractor 120b can differ by at least 0.5 eV and the energy $E_3$ of x-rays 113a diffracted by the first diffractor 120a and the energy $E_6$ of x-rays 113b diffracted by the second diffractor 120b can differ by at least 0.5 eV. In certain implementations, the diffractors 120 are configured such that the energy differences of the x-rays 113 diffracted by the sequentially impinged diffractors 120 is larger than the first energy resolution of the first diffractor 120a in the sagittal direction and the second energy resolution of the second diffractor 120b in the sagittal direction.

In certain implementations, each of the upstream diffractors 120 (e.g., diffractors 120 through which at least some of the x-rays are transmitted and propagate to impinge a downstream diffractor 120) comprises one or more thin crystals and/or crystal materials consisting essentially of low atomic number elements (e.g., LiF, diamond, HOPG/HAPG, Si, quartz). In certain implementations, an upstream diffractor 120 can consist essentially of a lower atomic number material (e.g., LiF, diamond, HOPG/HAPG) than does a downstream diffractor 120 (e.g., Si, Ge). The crystal thickness of each of the upstream diffractors 120 can be larger than an extinction depth of x-rays 113a having the maximum x-ray energies with which the diffractor 120 is to be used. For example, the extinction lengths can be substantially smaller than the x-ray linear attenuation length for x-rays with energies greater than 1.5 keV or for x-rays with energies greater than 3 keV and diffractors 120 consisting essentially of low atomic number materials (e.g., carbon, LiF, quartz, Si). For x-rays with energies greater than 6 keV, the diffractors 120 can comprise a plurality of thin LiF crystals distributed along the x-ray beam axis 104 and the apparatus 100 can measure XAS spectra of x-rays transmitted through the upstream crystals, albeit with corresponding 2D position-sensitive x-ray detectors. For example, the linear attenuation length of LiF for 10 keV x-rays can be 650 microns. In certain implementations, the one or more crystals are supported by rigid mechanical structures (e.g., frames; frames with supporting grids).

The crystals of the plurality of diffractors 120 (e.g., first and second diffractors 120a,b) can be configured to have x-ray energy resolutions that are substantially equal to one another or substantially different from one another and/or to have energy bandwidths that are substantially equal to one another or substantially different from one another, with spectra partially overlapping (e.g., by more than 3%, more than 10%, more than 20%, more than 50%) in the tangential plane, completely overlapping, or not overlapping one another. For example, a crystal of a first diffractor 120a and the corresponding first 2D position-sensitive x-ray detector 130a can be configured to measure XANES of an atomic element while another crystal of a second diffractor 120b and the corresponding 2D position-sensitive x-ray detector 130b can be configured to measure EXAFS of the same atomic element. In another example, two crystals of two diffractors 120 with their respective 2D position-sensitive x-ray detectors 130 can be configured to concurrently measure the XAS spectrum (e.g., XANES or EXAFS) of two or more different atomic elements in the sample 102 (e.g., measuring XAS of Mn, Co, and Ni in a lithium battery sample). In another example, multiple crystals of multiple diffractors 120 with their respective 2D position-sensitive x-ray detectors 130 can be configured to concurrently measure the XAS spectrum (e.g., XANES or EXAFS) of multiple different atomic elements in the sample 102.

In certain implementations, the diffractors 120 have less-than-perfect crystal planes, and the 2D position-sensitive x-ray detectors 130 are used to characterize the imperfection of the crystal planes such that each small region of the crystal can be considered perfect.

As shown in FIG. 5, at least a portion 115a of the x-rays 112 from (e.g., transmitted through) the sample 102 impinge the first diffractor 120a which angularly disperses (e.g., diffracts) x-rays 116a with energies in a range of $E_1$ to $E_3$ to the first 2D position-sensitive x-ray detector 130a. At least a portion 115b of the x-rays 112 from (e.g., transmitted through) the sample 102 impinge the second diffractor 120b which angularly disperses (e.g., diffracts) x-rays 116b with energies in a range of $E_4$ to $E_6$ to the second 2D position-sensitive x-ray detector 130b. The first and second diffractors 120a,b of FIG. 5 are configured to be impinged by different portions 115a,b of the x-rays 112 from (e.g., transmitted through) the sample 102. Certain such implementations can utilize more diverging x-rays 112 from the x-ray source 110.

In certain implementations, the apparatus 100 can have a configuration which is a combination of that of FIG. 4 and that of FIG. 5. For example, the apparatus 100 can comprise a first plurality of diffractors 120 distributed longitudinally along an x-ray beam axis 104a of a first portion 115a of the x-rays 112 from (e.g., transmitted through) the sample 102, a first plurality of 2D position-sensitive x-ray detectors 130 configured to receive the diffracted x-rays from the first plurality of diffractors 120, and a second plurality of diffractors 120 distributed longitudinally along an x-ray beam axis 104b of a second portion 115b of the x-rays 112 from (e.g., transmitted through) the sample 102, and a second plurality of 2D position-sensitive x-ray detectors 130 configured to receive the diffracted x-rays from the second plurality of diffractors 120.

Figure 6:
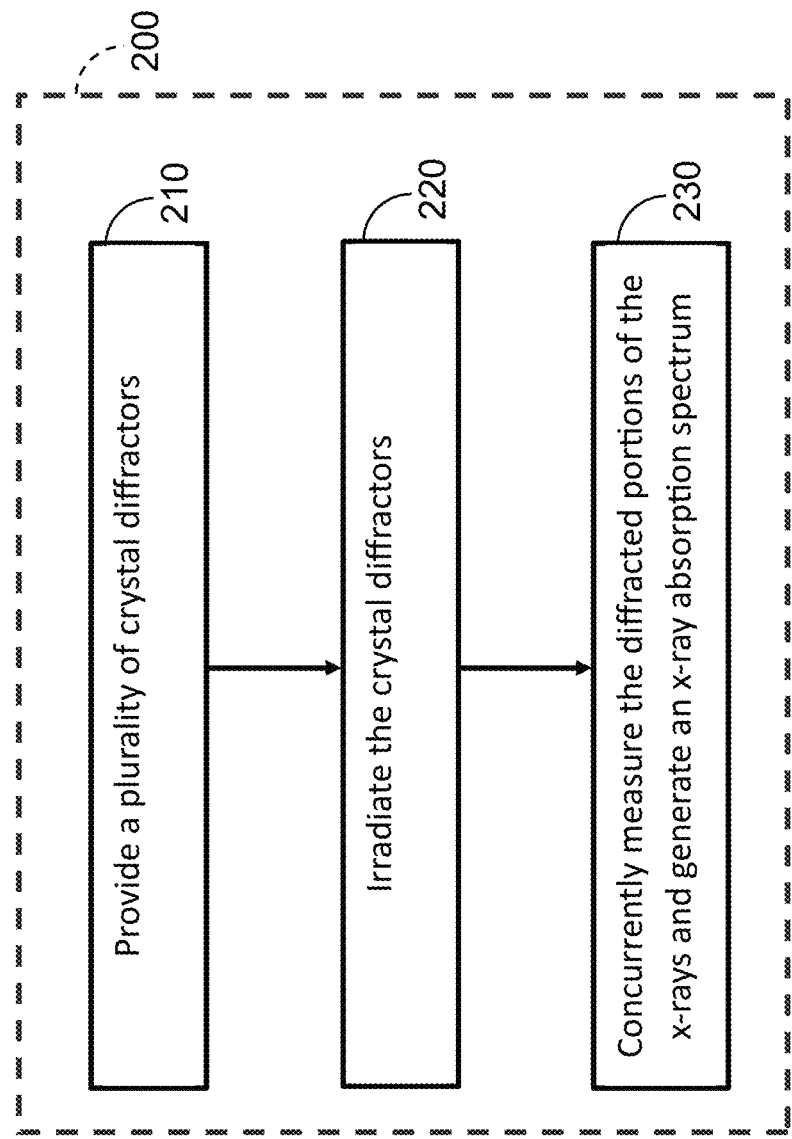
FIG. 6 is a flow diagram of an example method in accordance with certain implementations described herein.

FIG. 6 is a flow diagram of an example method 200 in accordance with certain implementations described herein. In an operational block 210, the method 200 comprises providing a plurality of crystal diffractors (e.g., diffractors 120), at least one crystal diffractor of the plurality of crystal diffractors having an energy resolution better than 30 eV. The plurality of crystal diffractors can be distributed along a single x-ray propagation axis (e.g., x-ray beam axis 104) of x-rays (e.g., x-rays 112) from a sample 102 (see, e.g., FIG. 4) or can be distributed along multiple x-ray propagation axes (e.g., x-ray beam axes 104a,b) of x-rays (e.g., x-rays 115a,b) from a sample 102 (see, e.g., FIG. 5). In an operational block 220, the method 200 further comprises irradiating the crystal diffractors using the x-rays such that each crystal diffractor of the plurality of crystal diffractors diffracts a corresponding portion of the x-rays in a tangential direction and in a sagittal direction. In an operational block 230, the method 200 further comprises concurrently measuring the diffracted portions of the x-rays from the plurality of crystal diffractors in the tangential direction and in the sagittal direction and generating an x-ray absorption spectrum of the sample using the measured diffracted portions of the x-rays in the tangential direction and in the sagittal direction. For example, the spectrum can comprise an absorption edge of the sample within an x-ray spectral range having a pre-edge range greater than 5 eV (e.g., greater than 10 eV; greater than 20 eV) and a post-edge range greater than 30 eV (e.g., greater than 50 eV; greater than 100 eV; greater than 300 eV). For another example, the spectrum can comprise an XANES portion and an EXAFS portion.

In certain implementations, the method 200 further comprises, without the sample 102 on the sample holder 160, concurrently measuring a diffracted portions of x-rays from the plurality of crystal diffractors in the tangential direction and in the sagittal direction and generating an x-ray absorption spectrum of the sample holder 160 without the sample 102 using the measured diffracted portions of the x-rays in the tangential direction and in the sagittal direction. In certain other implementations (e.g., with an x-ray source 110 providing a substantially stable x-ray flux), the method 200 does not comprise the measurements without the sample 102 on the sample holder 160.

In certain implementations, each crystal diffractor of the plurality of crystal diffractors has a corresponding Bragg angle along the x-ray propagation axis, and the Bragg angles of different crystal diffractors are different from one another. For example, an energy difference corresponding to the different Bragg angles of different crystal diffractors can be greater than an energy resolution of an upstream-most crystal diffractor of the plurality of crystal diffractors (e.g., for measuring XANES; for measuring EXAFS).

Example Implementations

Concurrent Transmission Mode XAS Measurements in Two Orthogonal Directions

In certain implementations, the apparatus 100 is configured to provide concurrent transmission mode XAS measurements in two substantially orthogonal directions (e.g., the tangential direction and the sagittal direction). As shown in FIG. 1, the x-ray source 110 can have an x-ray source spot size in the tangential direction $S_t$ that is less than 100 microns (e.g., less than 50 microns; less than 30 microns; less than 15 microns: less than 5 microns). The x-ray source spot can have an elongated shape with an x-ray source spot size in the sagittal direction $S_s$ that is substantially equal to or larger than the x-ray source spot size in the tangential direction $S_t$ and is less than 5 millimeters (e.g., less than 4 millimeters; less than 3 millimeters; less than 2 millimeters; less than 1 millimeter; less than 0.5 millimeter; less than 0.3 millimeter). The x-rays 112 can have a divergence greater than 5 mrad in both the first (e.g., tangential) direction and the second (e.g., sagittal) direction.

The at least one diffractor 120 can be flat or curved, and can have a first energy dispersing power in the first direction (e.g., tangential direction) and a second energy dispersing power in the second direction (e.g., a sagittal direction) that is at least two times lower than the first energy dispersing power.

The electromechanical subsystem 140 can be configured to controllably position the x-ray source 110, the at least one diffractor 120, and/or the at least one 2D position-sensitive x-ray detector 130 such that the at least one 2D position-sensitive x-ray detector 130 concurrently generates the first spectral information with a first predetermined energy resolution (e.g., in a range of 0.5 eV to 15 eV) over a first energy bandwidth and generate the second spectral information with a second predetermined energy resolution (e.g., in a range of 0.1 eV to 10 eV) over a second energy bandwidth in the second direction. The second predetermined energy resolution can be greater than 2× (e.g., greater than 5×; greater than 10×; greater than 100×; greater than 500×) the first predetermined energy resolution. For example, the electromechanical subsystem 140 can vary an angle between the x-ray source 110 and the at least one diffractor 120 (e.g., an angle between the x-ray beam axis 104 and the surface normal 122 of the at least one diffractor 120 at a center 123 of the x-rays 112 incident on the at least one diffractor 120) and/or can vary the orientation of the at least one 2D position-sensitive x-ray detector 130 to vary a mean energy of the detected x-ray energy band over a predetermined x-ray energy range.

The at least one 2D position-sensitive x-ray detector 130 can be configured to concurrently record x-ray intensities of at least some of the angularly dispersed x-rays 114 in the first and second directions and the circuitry 150 can be configured to process the recorded x-ray intensities as functions of position (e.g., pixel position indicative of x-ray energy) on the at least one 2D position-sensitive x-ray detector 130 to generate an x-ray absorption spectrum that is indicative of the interaction of the x-rays 112 with the sample 102. In certain implementations, the apparatus 100 further comprises a plurality of apertures (not shown) arranged along the second (e.g., sagittal) direction configured to define the x-ray energy bandwidth for each 2D position-sensitive x-ray detector 130.

Scanning Transmission Mode XAS System

In certain implementations, the apparatus 100 is configured to provide XAS measurements. For example, the x-ray source 110 can be configured to generate x-rays 112 with a divergence angle greater than 5 mrad over the two substantially orthogonal first and second directions. The at least one diffractor 120 can comprise at least one curved (e.g., bent) crystal on a Rowland circle with the x-ray source 110 (e.g., with the at least one 2D position-sensitive x-ray detector 130 configured to receive x-rays 114 from the at least one diffractor 120 within a distance from the at least one diffractor 120 from $Rt*\sin(\theta)$ to $4*R_t*\sin(\theta)$). The at least one curved crystal can be configured to angularly disperse (e.g., diffract) x-rays 114 over a finite spectral bandwidth as a function x-ray incidence angle on the at least one curved crystal in the first (e.g., tangential) and second (e.g., sagittal) directions, with the energy dispersion in the second direction having an angular dispersing power less than one-half the angular dispersing power in the first direction. The at least one 2D position-sensitive x-ray detector 130 can comprise a plurality of active x-ray detection elements (e.g., pixels) positioned along at least the second direction. The electromechanical subsystem 140 can be configured to scan the x-ray source 110, the at least one curved crystal of the at least one diffractor 120, and the plurality of active x-ray detection elements of the at least one 2D position-sensitive x-ray detector 130 to vary a mean energy of the finite spectral bandwidth over a predetermined x-ray energy range for an XAS measurement. In certain implementations, the apparatus 100 further comprises at least one aperture (not shown) on the Rowland circle with the x-ray source 110 and the at least one curved crystal of the at least one diffractor 120. For example, the at least one aperture can comprise at least one rectangular aperture (e.g., slit) having a long dimension along the second direction.

Scanning Fluorescence Mode XAS Measurements

In certain implementations, the apparatus 100 is configured to provide scanning fluorescence mode XAS measurements. For example, the x-ray source 110 can be configured to generate x-rays 112 with a divergence angle greater than 5 mrad over the two substantially orthogonal first and second directions. The x-ray source size $S_t$ in the first (e.g., tangential) direction can be less than 100 microns (e.g., less than 50 microns; less than 30 microns; less than 15 microns; less than 5 microns) and the x-ray source size $S_s$ in the second (e.g., sagittal; azimuthal) direction can be equal to or greater than $S_t$, but less than 4 millimeters (e.g., less than 2 millimeters; less than 1 millimeter; less than 0.5 millimeter; less than 0.3 millimeter). The at least one diffractor 120 can comprise at least one curved crystal on a Rowland circle with the x-ray source 110, with the at least one curved crystal configured to energy disperse the x-rays 113 in a predetermined x-ray energy band as a function of x-ray incidence angles on the at least one curved crystal in the first and second directions with the energy dispersion in the second direction having an angular dispersing power less than one-half the angular dispersing power than in the first direction.

The sample holder 160 can be configured to position the sample 102 in the x-ray beam path downstream from the at least one diffractor 120 (e.g., near a focal point of the at least one curved crystal on the Rowland circle). For example, for a substantially flat sample 102, the sample holder 160 can hold the sample 102 such that an incidence angle of the x-rays 112 relative to a surface of the sample 102 is less than 45 degrees (e.g., less than 30 degrees; less than 15 degrees; less than 10 degrees) to enable at least one 2D position-sensitive x-ray detector 130 and the at least one diffractor 120 to be positioned close to increase a collection solid angle of fluorescence x-rays from the sample 102.

The at least one 2D position-sensitive x-ray detector 130 can comprise a plurality of energy-dispersive detectors, with at least one of the energy-dispersive detectors positioned near an x-ray illuminated area of the sample 102 (e.g., at a distance less than 15 millimeters, less than 10 millimeters, less than 5 millimeters, or less than 3 millimeters) and extending along at least the sagittal direction. The plurality of energy-dispersive detectors can be configured to concurrently record fluorescence x-rays of an element of interest resulting from the interaction of x-rays incident on the sample 102. The electromechanical subsystem 140 can be configured to scan the x-ray source 110 and the at least one diffractor 120 and/or the plurality of energy-dispersive detectors to vary a mean energy of a predetermined x-ray energy band over a predetermined x-ray energy range for an XAS measurement.

For example, the at least one 2D position-sensitive x-ray detector 130 can comprise a photon counting detector having energy discrimination capability and a large area (e.g., greater than 200 mm$^2$; greater than 500 mm$^2$; greater than 1000 mm$^2$; greater than 5000 mm$^2$). The at least one 2D position-sensitive x-ray detector 130 can be configured to detect and measure fluorescence x-rays within an energy bandwidth defined by energy threshold settings. In certain implementations, the at least one 2D position-sensitive x-ray detector 130 can comprise a pixelated detector or a large area detector operated in XAS transmission mode.

In certain implementations, the apparatus 100 further comprises a plurality of apertures arranged along the sagittal direction, along the tangential direction, or along both the sagittal and tangential directions. The plurality of apertures can be configured to define an x-ray energy bandwidth for each energy-dispersive detector. For example, the plurality of apertures can be configured to be used with a large area pixelated detector and to define an energy bandwidth (e.g., defined by individual apertures) for a small range of active pixels (e.g., in a range of 5 to 15 pixels; about 10 pixels; in a range of 40 to 60 pixels; about 50 pixels; in a range of 80 to 120 pixels; about 100 pixels; in a range of 230 to 270 pixels; about 250 pixels). In certain such implementations, the large area detector is positioned at a distance of less than 50 millimeters (e.g., less than 25 millimeters; less than 10 millimeters; less than 5 millimeters) from the x-ray illuminated area of the sample 102. In certain such implementations, the large area detector can have energy discrimination capability.

In certain implementations, the sample 102 can comprise a pellet, a thin film, or a powder. The sample 102 can be mounted on a substrate having a thickness greater than 50 microns (e.g., greater than 500 microns; greater than 1 millimeter; greater than 10 millimeters). Any sample 102 can be used in the fluorescence mode provided the self-absorption correction (e.g., the absorption of fluorescence x-rays by the elemental species in the sample 102 itself) can be quantified. However, for concentrated samples 102, quantifying the self-absorption correction is not always trivial. Hence, in certain implementations, the XAS measurements can be performed in fluorescence mode on dilute samples 102 where the concentration for the element of interest is low (e.g., less than 20% by wt.; less than 10% by wt.; less than 5% by wt.; less than 1% by wt.).

Crystal Selection

In certain implementations, the crystal material and/or the diffraction Miller indices of the crystals of the at least one diffractor 120 can be selected in accordance with certain implementations described herein. While the following example is described with regard to selecting flat crystals, similar design considerations can be used for selecting curved crystals in accordance with certain other implementations described herein.

Diverging x-rays that are incident on a flat crystal can be dispersed in both the tangential and sagittal directions and can be used for XAS measurements. The relative performances of different flat crystal materials with different Miller indices can be compared for XAS measurements over a predetermined x-ray energy (e.g., spectral) range (e.g., about 100 eV for XANES and about 700 eV for EXAFS, with a starting energy of 8 keV).

For the tangential plane, two crystal parameters can be considered for XAS measurements in the tangential plane: (i) tangential crystal spectral efficiency $\eta_t$, defined as the product of an angular range of Bragg angles that cover the x-ray energy range, the inherent energy resolution of a crystal, and the peak reflectivity of the crystal, and (ii) tangential angular spectral efficiency $\Delta\eta_t$, defined as $\eta_t$ divided by the angular range of Bragg angles that cover the x-ray energy range.

For XANES measurements with 100 eV energy measurement range from 8 keV to 8.1 keV, Tables 1-3 show example calculated values for three crystal materials and several diffraction Miller indices.

TABLE 1

LiF crystal: $\theta_1$ and $\theta_2$ are Bragg angles for 8 keV and 8.1 keV, respectively; $\Delta\theta = \theta_1 - \theta_2$, $\Delta\eta_t = \eta_t / \Delta\theta$

| | Bragg Angles (degrees) | | | Ec | Peak | | |
|---|---|---|---|---|---|---|---|
| | $\theta_1$ | $\theta_2$ | $\Delta\theta$ | (eV) | Reflectivity | $\eta_t$ | $\Delta\eta_t$ |
| LiF(200) | 22.59 | 22.29 | 0.3 | 0.57 | 0.85 | 0.15 | 0.5 |
| LiF(400) | 50.19 | 49.35 | 0.74 | 0.08 | 0.59 | 0.035 | 0.05 |

TABLE 2

Ge crystal: $\theta_1$ and $\theta_2$ are Bragg angles for 8 keV and 8.1 keV, respectively; $\Delta\theta = \theta_1 - \theta_2$, $\Delta\eta_t = \eta_t / \Delta\theta$

| | Bragg Angles (degrees) | | | Ec | Peak | | |
|---|---|---|---|---|---|---|---|
| | $\theta_1$ | $\theta_2$ | $\Delta\theta$ | (eV) | Reflectivity | $\eta_t$ | $\Delta\eta_t$ |
| Ge(111) | 13.72 | 13.55 | 0.17 | 2.67 | 0.88 | 0.40 | 2.35 |
| Ge(220) | 22.79 | 22.49 | 0.5 | 1.22 | 0.85 | 0.52 | 1.04 |
| Ge(311) | 27.02 | 26.66 | 0.36 | 0.59 | 0.73 | 0.16 | 0.43 |
| Ge(331) | 37.20 | 36.66 | 0.54 | 0.29 | 0.58 | 0.09 | 0.17 |
| Ge(440) | 49.93 | 49.10 | 0.83 | 0.21 | 0.57 | 0.1 | 0.12 |
| Ge(551) | 78.00 | 75.03 | 2.97 | 0.07 | 0.83 | 0.17 | 0.06 |

TABLE 3

Si crystal: $\theta_1$ and $\theta_2$ are Bragg angles for 8 keV and 8.1 keV, respectively; $\Delta\theta = \theta_1 - \theta_2$, $\Delta\eta_t = \eta_t / \Delta\theta$

| | Bragg Angles (degrees) | | | Ec | Peak | | |
|---|---|---|---|---|---|---|---|
| | $\theta_1$ | $\theta_2$ | $\Delta\theta$ | (eV) | Reflectivity | $\eta_t$ | $\Delta\eta_t$ |
| Si(111) | 14.31 | 14.13 | 0.18 | 1.14 | 0.88 | 0.18 | 1.0 |
| Si(220) | 23.8 | 23.49 | 0.31 | 0.5 | 0.83 | 0.13 | 0.42 |
| Si(311) | 28.24 | 27.86 | 0.38 | 0.24 | 0.7 | 0.06 | 0.17 |
| Si(331) | 38.46 | 37.90 | 0.56 | 0.12 | 0.56 | 0.04 | 0.07 |
| Si(440) | 53.8 | 52.8 | 1.0 | 0.09 | 0.65 | 0.06 | 0.06 |
| Si(531) | 57.58 | 56.48 | 1.1 | 0.06 | 0.64 | 0.04 | 0.03 |

As seen in Tables 1-3:
The crystal tangential spectral efficiency is lowest near 45 degrees Bragg angles (e.g., from 35-55 degrees; largely due to the polarization effect).
The crystal tangential angular spectral efficiency decreases with Bragg angles.

Both the crystal tangential spectral efficiency and the tangential angular spectral efficiency of crystals with even number Miller indices have larger values than do crystals with odd number Miller indices at similar Bragg angles.

For XANES measurements with resolution better than about 1 eV, Ge(220), Li(111), and Si(111) provide better values of the crystal tangential spectral efficiency divided by the energy resolution, but the differences between their crystal tangential angular spectral efficiencies are small.

Certain implementations described herein can advantageously relax the x-ray energy resolution in the tangential plane while obtaining adequate energy resolution in the sagittal direction. For example, the flat crystals can operate at lower Bragg angles such that $\Delta E'$ is comparable to or smaller than the resolution used for an XAS spectrum (e.g., $\Delta E'/E<10^{-4}$ for XANES and $\Delta E'/E<4\times 10^{-4}$ for EXAFS), thus avoiding a drawback of a crystal operating at high Bragg angles with excessively narrow inherent crystal energy resolution $E_i$, which can be less than 0.03 eV, which is significantly less than the energy resolution used for XAS measurements (e.g., 1.5 eV for Cu XANES measurement and about 4 eV for EXAFS measurements with k values greater than 3). Using low to medium Bragg angles (e.g., in a range of 5 degrees to 35 degrees), flat crystals with relatively large inherent energy resolutions (e.g., close to the predetermined measurement energy resolution) can be used to increase the crystal diffraction efficiency.

In certain implementations, a relatively small source-to-crystal distance $L_1$ can advantageously enable the use of small crystals and a wide variety of 2D position-sensitive x-ray detectors 130, and using small crystals can enable the parameters for XAS measurements to be optimized over the x-ray operation energy range for XAS measurements. For example, an appropriate inherent energy resolution can be used by selecting various aspects of the crystals, such as the crystal materials (e.g., LiF, diamond, quartz, silicon, germanium, and HOPG/HAPG), the Miller indices, symmetric or asymmetric cut crystals, low cost crystals, multiple crystals, and compact system designs. For another example, small crystals can facilitate the use of thin crystals in certain implementations disclosed herein.

In certain implementations, a relatively small source-to-crystal distance $L_1$ can advantageously enable the use of small 2D position-sensitive x-ray detectors 130 with appropriate parameters, such as number of detection elements (e.g., pixel numbers), pixel size, and cost.

In certain implementations, a relatively large divergence angle $\theta_s$ of the x-rays received by the at least one diffractor 120 in the sagittal direction (e.g., up to 100 mrad) can advantageously increase the data collection speed with a 2D position-sensitive x-ray detector 130 to make use of x-ray dispersion in the sagittal direction, which can be difficult for crystals bent in the sagittal direction, such as Von Hamos crystals, spherically bent crystals, and toroidal crystals.

In certain implementations, an apparatus 100 with flat crystals can be advantageously simpler to align as compared to an apparatus 100 with curved crystals.

In certain implementations, high resolution/small spot analysis with high angular spectral efficiency can advantageously be used to place the sample 102 closer to the x-ray source 110.

In certain implementations having a relaxed energy resolution in the tangential plane, crystals having wider intrinsic energy resolution $E_c$ can advantageously use wider energy bandwidths of source x-rays 112 propagating from the x-ray source 110 and thus increase the data collection speed (e.g., achieved using asymmetric cut crystals).

X-Ray Source Selection

In certain implementations, the x-ray source 110 can be either a primary x-ray source (e.g., an electron impact x-ray source), a secondary source produced by focusing x-rays from a primary source by x-ray focusing optics (e.g., a capillary optic, a polycapillary optic, or KB mirror pair) or a synchrotron source with a focusing optic. With a secondary source, the sample 102 can be positioned at the x-ray source 110. An electron impact source can be either a reflection type x-ray source or transmission type of x-ray source.

In certain implementations, for a predetermined x-ray source spot size $S_t$ in the tangential plane and a predetermined measurement energy resolution $\Delta E$ for XAS, the source-to-crystal distance $L_1$ can be at least larger than $S_t * \cot(\theta)*E/\Delta E$. For a predetermined x-ray source spot size $S_t$, $L_1$ can be proportional to $E/\Delta E$. Therefore, increasing $E/\Delta E$ can enable a small $L_1$ to be used. By relaxing $E/\Delta E$ in accordance with certain implementations described herein, a relatively large $S_t$ (e.g., up to 100 microns) can be used to keep $L_1$ within a predetermined range.

Using flat crystals with conventional laboratory XAS systems that are not in accordance with certain implementations described herein have various difficulties, including the size of the conventional XAS system. For example, in conventional systems, to achieve an energy resolution of $E/\Delta E=10^4$ (e.g., a value that can be used for XANES measurements) and $S_t=100$ microns, a source-to-crystal distance $L_1$ greater than 270 centimeters can be used. For EXAFS measurements with an energy resolution of $E/\Delta E=4\times 10^3$, in conventional systems, a source-to-crystal distance greater than 65 centimeters is used. For concurrently measuring Cu K-edge XANES with an energy band of 100 eV using a Ge(311) crystal (e.g., Bragg angle of about 23.8 degrees), the crystal of conventional systems would accept about 5 mrad (e.g., 0.3 degree) of beam divergence in the tangential plane, corresponding a crystal length of 34.6 millimeters along the tangential plane. For concurrently measuring Cu K-edge EXAFS with an energy coverage of 700 eV using the same Ge(311) crystal, the crystal length for conventional systems increases by about 7×, such that the length becomes impractically long. Even with reducing the source-to-crystal distance for EXAFS only by moving the crystal closer to the x-ray source from 270 centimeters to 65 centimeters, in conventional systems, the length of the crystal would be larger than 36 mm*700/100*270/65. In the sagittal direction, the large source-to-crystal distance in conventional systems also leads to large crystal sizes. As the energy spread from beam divergence in the sagittal direction is approximately given by $E*\theta s^2$, in conventional systems, $\theta s=$about 10 mrad would be used to achieve about 1 eV energy resolution for 9 keV x-rays, with a crystal having a width of 27 mm in the sagittal direction. To record the diffracted x-rays with sufficient energy resolution, in conventional systems, a large 2D position-sensitive x-ray detector (at least along the dispersion direction) with many pixels (e.g., in a range of 200 to 500) would be used.

In certain implementations described herein, relaxing $E/\Delta E$ (e.g., 3×, 10×) allows various geometric parameters discussed above to be reduced in proportion.

In certain implementations, an apparatus 100 to be used as an XAS system comprises a microfocus x-ray source 110 with relatively small source spot sizes (e.g., less than 100 microns; less than 50 microns; less than 25 microns; less than 10 microns) and at least one diffractor 120 comprising one or more flat crystals. With a relatively small x-ray source spot size in the tangential plane, an XAS system in accordance with certain implementations comprising one or more flat crystals can overcome various aforementioned shortcomings and can offer various practical advantages, including but not limited to: using easy-to-obtain high-quality single crystals at reasonable cost with materials that are widely available; being easy to optimize for specific applications (e.g., using asymmetric cut crystals to either narrow or broaden energy resolution of a crystal from its symmetric cut; being easily thinned to enable further spectral measurement of transmitted x-rays by another downstream x-ray spectrometer (e.g., at least one flat crystal based spectrometer or an array of flat crystal spectrometers configured along the same beam propagation direction on the first flat crystal spectrometer) as described herein. Additionally, certain implementations use at least one 2D position-sensitive x-ray detector to use x-ray dispersion in the sagittal direction to increase throughput.

In certain implementations, to reduce (e.g., minimize; prevent; avoid) high harmonic contamination (e.g., higher energy x-rays reflected by a crystal), the maximum x-ray energy of the source x-rays 112 can be less than the lowest energy of the higher harmonic x-rays. For example, for Si(111), the lowest high harmonic reflection is Si(333) which has an energy three times the Si(111) reflection.

In certain implementations, to minimize spectral contamination of the XAS spectrum, the target material of the x-ray source 110 can have high elemental purity (e.g., less than 10 parts per million of atomic elements with characteristic lines within the energy bandwidth of XAS spectra to be measured).

2D Position-Sensitive X-Ray Detector Selection

Suitable 2D position-sensitive x-ray detectors 130 compatible with certain implementations described herein include, but are not limited to: direct detection CCD detectors, CMOS detectors, and photon counting directors. The minimum number of pixels in the tangential plane can be comparable to or larger than the number of energy bins to be measured in the XAS spectrum. In certain implementations, the 2D position-sensitive x-ray detector 130 has at least one energy threshold or an energy window.

Other System Design Aspects

In certain implementations, for an apparatus 100 with predetermined parameters of the x-ray source 110, the at least one diffractor 120, and the at least one 2D position-sensitive x-ray detector 130, changing $L_1$ can be used to change the x-ray energy resolution and/or spectral coverage.

In certain implementations (e.g., XAS measurements of liquid or powder samples), the x-ray beam axis 104 can be substantially along the vertical direction to facilitate sample loading (e.g., in a liquid cell).

In certain implementations, measurements on a predetermined area of the sample 102 can be performed. For example, a short distance between the x-ray source 110 and the sample 102 (e.g., less than 50 millimeters; less than 25 millimeters; less than 5 millimeters) can be used as the measurement area on the sample 102 is equal to this distance multiplied by the x-ray beam divergence in the tangential and sagittal directions used for the measurement. A transmission type of x-ray source 110 with a small distance between the x-ray source spot and the vacuum window can be used.

In certain implementations with non-uniform samples 102, the position-dependent XAS spectrum can be mapped by taking XAS spectra at predetermined positions of the sample 102 relative to the x-ray beam axis 104. A short source-to-sample distance can be used as the sizes of the diverging x-rays 112 on the sample 102 is proportional to the distance. Transmission x-ray sources 110 with very short distances between the x-ray source spot and the vacuum window of the x-ray source 110 can be used.

In certain implementations, the apparatus 100 can comprise an aperture (e.g., slit) along the x-ray beam axis 104 to limit the divergence of the x-rays 112 within the XAS measurement to reduce (e.g., minimize; prevent; avoid) scattering of unnecessary x-rays by the diffractor 120 and other components from reaching the detector 130.

Fluorescence Mode XAS Measurements

Figure 7:
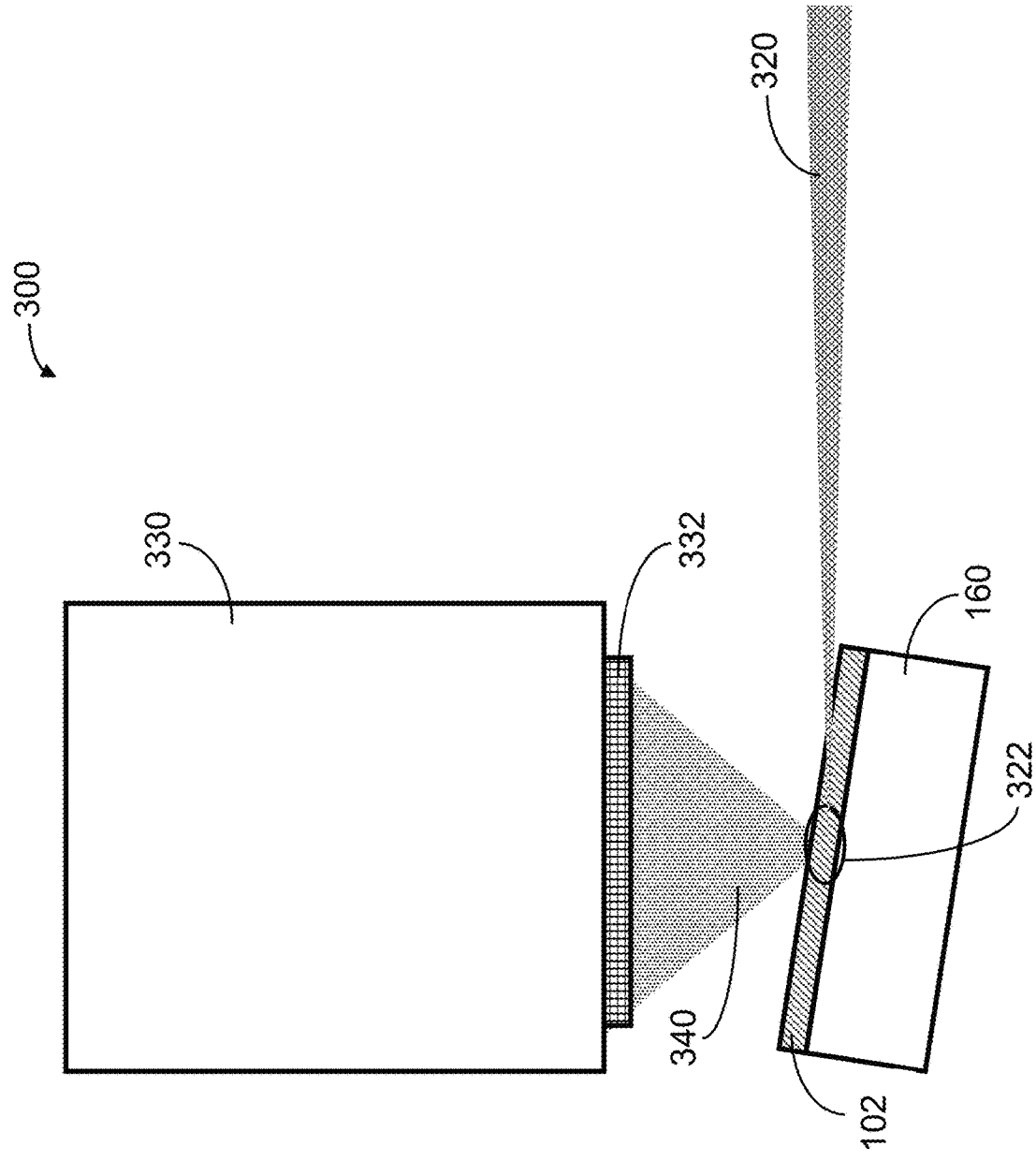
FIGS. 7 and 8 schematically illustrate example subsystems of an apparatus for XAS fluorescence mode measurements in accordance with certain implementations described herein.
Figure 8:
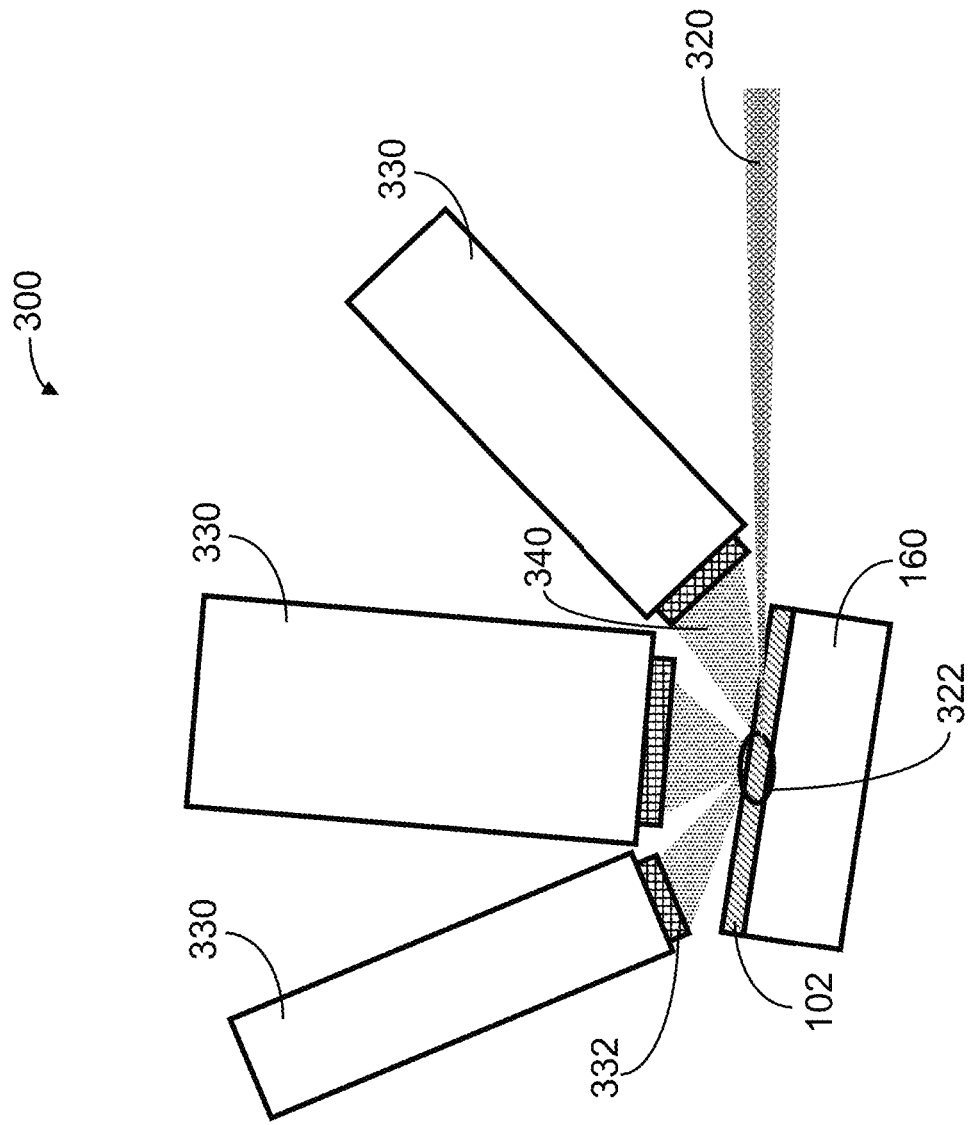

In certain implementations, the apparatus 100 is configured to provide fluorescence mode XAS measurements. FIGS. 7 and 8 schematically illustrate example subsystems 300 of an apparatus 100 for XAS fluorescence mode measurements in accordance with certain implementations described herein. In FIG. 7, the example subsystem 300 comprises a single energy dispersive detector 330 (e.g., SDD) comprising a detector element 332 configured to detect fluorescence x-rays 340 emitted from the sample 102. In FIG. 8, the example subsystem 300 comprises a plurality of energy dispersive detectors 330 (e.g., three silicon drift detectors), each comprising a detector element 332 configured to detect fluorescence x-rays 340 emitted from the sample 102.

As shown in FIGS. 7 and 8, an x-ray beam 320 is incident on a surface of the sample 102 which is affixed to a sample holder 160 (e.g., a substrate upon which the sample 102 is deposited). The incident x-ray beam 320 can be focused and incident on the sample 102 at a shallow angle (e.g., less than 10 degrees; less than 5 degrees; less than 3 degrees) relative to the sample surface, enabling the single energy dispersive detector 330 of FIG. 7 or the plurality of energy dispersive detectors of FIG. 8 to be positioned very close to the fluorescence x-ray generation volume 322 of the sample 102 illuminated by the incident x-ray beam 320, thereby increasing the collection solid angle for the fluorescence x-rays 340.

Figure 9:
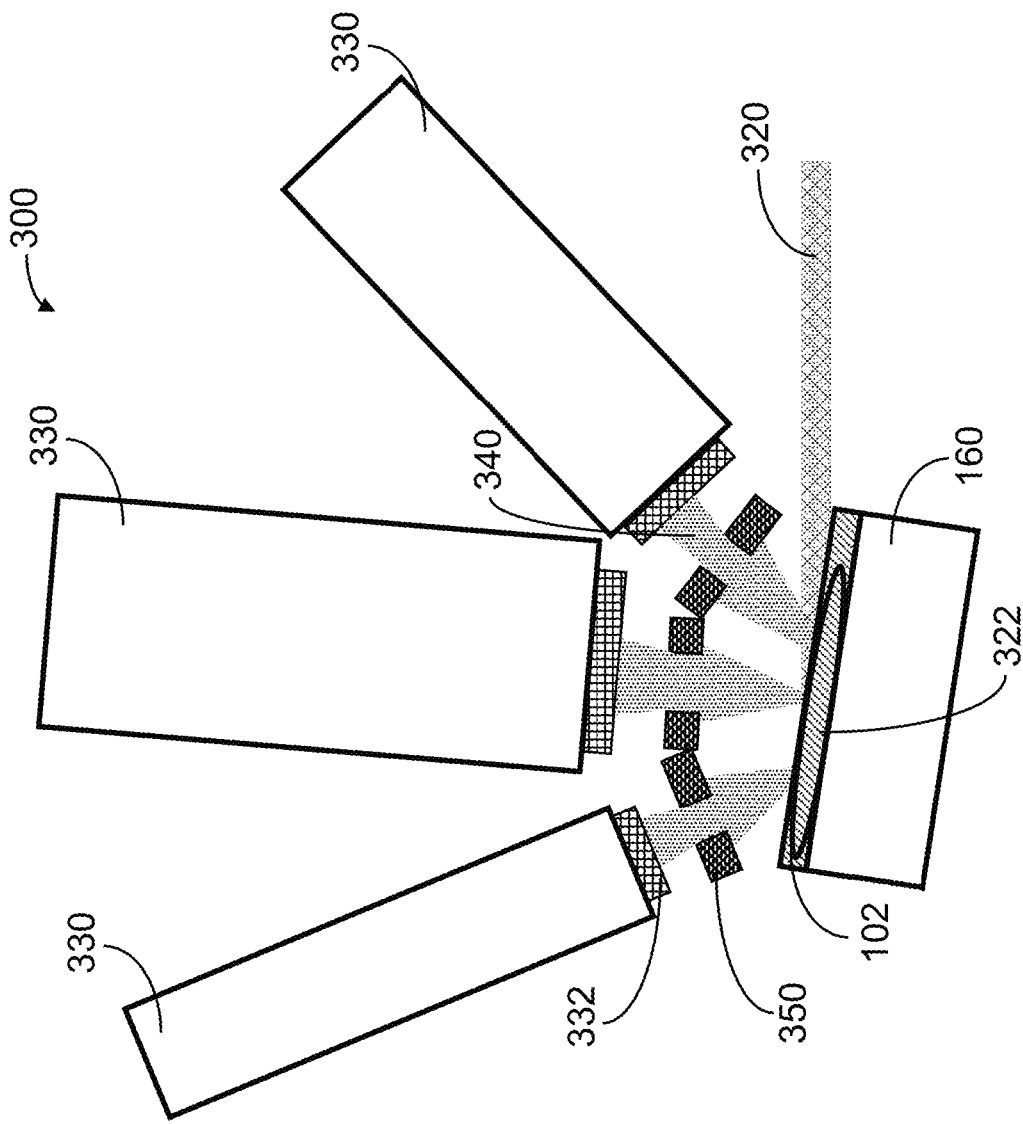
FIG. 9 schematically illustrates another example subsystem of an apparatus for XAS fluorescence mode measurements in accordance with certain implementations described herein.

FIG. 9 schematically illustrates another example subsystem 300 of an apparatus 100 for XAS fluorescence mode measurements in accordance with certain implementations described herein. The subsystem 300 of FIG. 9 further comprises a plurality of apertures 350 extending in the sagittal direction to define the x-ray energy bandwidth for each of the energy dispersive detectors 330 or detector elements 332 (e.g., three apertures 350 for three detectors 330 as shown in FIG. 9).

Figure 10:
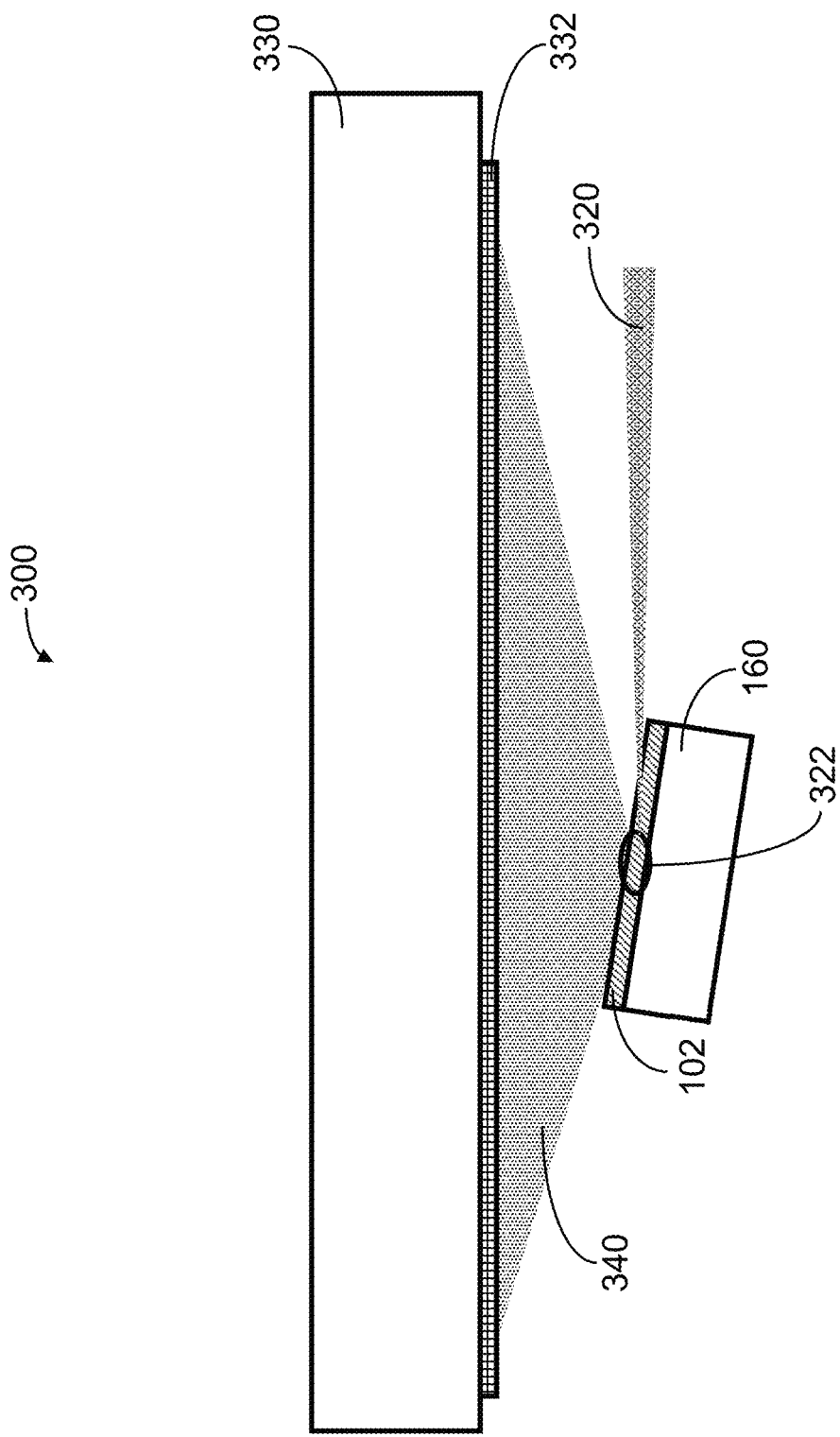
FIG. 10 schematically illustrates an example subsystem of an apparatus for XAS fluorescence mode measurements in accordance with certain implementations described herein.

FIG. 10 schematically illustrates an example subsystem 300 of an apparatus 100 for XAS fluorescence mode measurements in accordance with certain implementations described herein. The subsystem 300 of FIG. 10 comprises a large area detector 330 with energy discriminating capability in accordance with certain implementations described herein.

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," less than," "between," and the like includes the number recited. As used herein, the meaning of "a," "an," and "said" includes plural reference unless the context clearly dictates otherwise. While the structures and/or methods are discussed herein in terms of elements labeled by ordinal adjectives (e.g., first, second, etc.), the ordinal adjectives are used merely as labels to distinguish one element from another, and the ordinal adjectives are not used to denote an order of these elements or of their use.

Various configurations have been described above. It is to be appreciated that the implementations disclosed herein are not mutually exclusive and may be combined with one another in various arrangements. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. An apparatus comprising:
    an x-ray source configured to generate x-rays diverging in a first direction and diverging in a second direction substantially orthogonal to the first direction, the x-rays having a spectral intensity variation less than 10% over an energy bandwidth greater than 25 eV with at least one x-ray energy between 1 keV and 30 keV, at least some of the x-rays impinging a sample;
    at least one diffractor that is substantially flat, the at least one diffractor configured to receive and concurrently diffract at least some of the x-rays as a function of x-ray energy in the first direction and in the second direction;
    at least one two-dimensional (2D) position-sensitive x-ray detector configured to receive at least some of the x-rays diffracted in the first direction by the at least one diffractor and at least some of the x-rays diffracted in the second direction by the at least one diffractor and to concurrently generate first spectral information of the x-rays diffracted in the first direction and second spectral information of the x-rays diffracted in the second direction;
    an electromechanical subsystem configured to position the x-ray source, the at least one diffractor, and/or the at least one 2D position-sensitive x-ray detector relative to one another;
    circuitry configured to receive the first and second spectral information from the at least one 2D position-sensitive x-ray detector and to generate a single x-ray absorption spectroscopy (XAS) spectrum using the first and second spectral information; and
    a sample holder configured to hold the sample between the x-ray source and the at least one diffractor or between the at least one diffractor and the at least one 2D position-sensitive x-ray detector.

2. The apparatus of claim 1, wherein the electromechanical subsystem is configured to controllably position the x-ray source, the at least one diffractor, and/or the at least one 2D position-sensitive x-ray detector such that the at least one 2D position-sensitive x-ray detector concurrently generates the first spectral information with a first predetermined energy resolution over a first energy bandwidth and generates the second spectral information with a second predetermined energy resolution over a second energy bandwidth in the second direction.

3. The apparatus of claim 1, wherein the x-rays generated by the x-ray source have an angular divergence greater than 5 mrad.

4. The apparatus of claim 1, wherein the x-ray source comprises an x-ray focusing optic.

5. The apparatus of claim 1, wherein the at least one diffractor comprises a plurality of crystals arranged along an incident x-ray beam axis such that the x-rays from the sample impinge the crystals sequentially, a plurality of mosaic crystals, or a single crystal comprising a material selected from the group consisting of: diamond; graphite; quartz; LiF; silicon; germanium.

6. The apparatus of claim 1, wherein the electromechanical subsystem is configured to controllably position the at least one diffractor and to change Bragg angles of the at least one diffractor.

7. The apparatus of claim 1, wherein the at least one diffractor comprises:
    a first diffractor configured to receive the x-rays from the sample and to concurrently diffract at least some of the received x-rays as a function of x-ray energy in the first direction and in the second direction; and a second diffractor configured to receive second x-rays from the sample and to concurrently diffract at least some of the received second x-rays as a function of x-ray energy in the first direction and in the second direction.

8. The apparatus of claim 1, wherein the sample holder is configured to position a substantially flat sample such that an incidence angle of the x-rays relative to a surface of the sample is less than 45 degrees.

9. The apparatus of claim 1, wherein the sample holder is configured to hold the sample between the at least one diffractor and the at least one 2D position-sensitive x-ray detector and the at least one 2D position-sensitive x-ray detector is positioned at a distance less than 15 millimeters from an area of the sample illuminated by the x-rays.

10. The apparatus of claim 1, wherein the sample holder is configured to hold the sample between the x-ray source and the at least one diffractor,
the at least one diffractor comprising a plurality of crystal diffractors distributed along at least one x-ray propagation axis of x-rays from the sample, at least one crystal diffractor of the plurality of crystal diffractors having an energy resolution better than 30 eV, wherein each crystal diffractor of the plurality of crystal diffractors concurrently diffracts a corresponding portion of the x-rays from the sample in the first direction and in the second direction.

11. The apparatus of claim 10, wherein the spectrum comprises an absorption edge of the sample within an x-ray spectral range having a pre-edge range greater than 5 eV and a post-edge range greater than 30 eV.

12. The apparatus of claim 10, wherein the spectrum comprises an XANES portion and an EXAFS portion.

13. The apparatus of claim 10, wherein each crystal diffractor of the plurality of crystal diffractors has a corresponding Bragg angle along the x-ray propagation axis, and the Bragg angles of different crystal diffractors are different from one another.

14. The apparatus of claim 13, wherein an energy difference corresponding to the different Bragg angles of different crystal diffractors is greater than an energy resolution of an upstream-most crystal diffractor of the plurality of crystal diffractors.

15. An apparatus comprising:
an x-ray source configured to generate x-rays diverging in a first direction and diverging in a second direction substantially orthogonal to the first direction, the x-rays having a spectral intensity variation less than 10% over an energy bandwidth greater than 25 eV with at least one x-ray energy between 1 keV and 30 keV, at least some of the x-rays impinging a sample;
at least one diffractor configured to receive and to concurrently diffract at least some of the x-rays as a function of x-ray energy in the first direction and in the second direction, wherein the at least one diffractor comprises:
a first diffractor configured to receive the x-rays from the sample and to concurrently diffract at least some of the received x-rays as a function of x-ray energy in the first direction and in the second direction; and
a second diffractor configured to receive second x-rays transmitted through the first diffractor and to concurrently diffract at least some of the received second x-rays as a function of x-ray energy in the first direction and in the second direction;

at least one two-dimensional (2D) position-sensitive x-ray detector configured to receive at least some of the x-rays diffracted in the first direction by the at least one diffractor and at least some of the x-rays diffracted in the second direction by the at least one diffractor and to concurrently generate first spectral information of the x-rays diffracted in the first direction and second spectral information of the x-rays diffracted in the second direction;

an electromechanical subsystem configured to position the x-ray source, the at least one diffractor, and/or the at least one 2D position-sensitive x-ray detector relative to one another;

circuitry configured to receive the first and second spectral information from the at least one 2D position-sensitive x-ray detector and to generate a single x-ray absorption spectroscopy (XAS) spectrum using the first and second spectral information; and a sample holder configured to hold the sample between the x-ray source and the at least one diffractor or between the at least one diffractor and the at least one 2D position-sensitive x-ray detector.

16. The apparatus of claim 15, wherein the x-ray source, the at least one diffractor, and the at least one 2D position-sensitive x-ray detector are configured to satisfy at least one of:

$L_1 < 2 * R_t * \sin(\theta)$, where $L_1$ is a distance between the x-ray source and the at least one diffractor, and $R_t$ is a smallest value of a radius curvature of the at least one diffractor in the first direction;

$L_2 < 2 * R_t * \sin(\theta)$, where $L_2$ is a distance between the at least one diffractor and the at least one 2D position-sensitive x-ray detector; and $$1/L_1 + 1/L_2 < 2/(R_t * \sin(\theta)).$$

17. The apparatus of claim 15, wherein the at least one 2D position-sensitive x-ray detector comprises:
a first 2D position-sensitive x-ray detector configured to receive the x-rays diffracted by the first diffractor; and
a second 2D position-sensitive x-ray detector configured to receive the second x-rays diffracted by the second diffractor.

18. The apparatus of claim 17, wherein the electromechanical subsystem is configured to controllably position the x-ray source, the first diffractor, the second diffractor, the first 2D position-sensitive x-ray detector, and the second 2D position-sensitive x-ray detector relative to one another.

19. The apparatus of claim 15, wherein the x-ray source and the at least one diffractor are configured on a Rowland circle, the at least one diffractor having a smallest value of a radius curvature $R_t$ in the first direction, and the at least one 2D position-sensitive x-ray detector is configured to receive x-rays from the at least one diffractor within a distance from the at least one diffractor from $Rt*\sin(\theta)$ to $4*R_t*\sin(\theta)$.

20. The apparatus of claim 15, wherein the x-rays diffracted in the first direction by the first diffractor have energies in a range of $E_1$ to $E_3$ and the second x-rays diffracted in the first direction by the second diffractor have energies in a range of $E_4$ to $E_6$, with an energy difference between $E_4$ and $E_1$ of at least 0.5 eV.

21. The apparatus of claim 15, wherein an energy difference of the x-rays diffracted in the first direction by the first diffractor and the second x-rays diffracted in the second direction by the second diffractor is larger than an energy resolution of the first diffractor in the second direction and a second energy resolution of the second diffractor in the second direction.

22. The apparatus of claim 15, wherein the second diffractor comprises a plurality of crystals arranged along an incident x-ray beam axis such that the x-rays from the sample impinge the crystals sequentially, mosaic crystals, or single crystals comprising a material selected from the group consisting of: diamond, graphite, quartz, LiF, silicon, germanium.

23. The apparatus of claim 15, wherein the second diffractor differs from the first diffractor in material, diffraction plane indices, shape, and/or asymmetric cut angle.

* * * * *